US009183192B1

(12) United States Patent
Ruby, Jr. et al.

(10) Patent No.: US 9,183,192 B1
(45) Date of Patent: Nov. 10, 2015

(54) TRANSLATOR

(75) Inventors: Ralph Ruby, Jr., Jonesboro, AR (US);
Paula D. Ruby, Jonesboro, AR (US)

(73) Assignee: Ruby Investments Properties LLC,
Jonesboro, AR (US)

( * ) Notice: Subject to any disclaimer, the term of this patent is extended or adjusted under 35 U.S.C. 154(b) by 716 days.

(21) Appl. No.: 13/065,202

(22) Filed: Mar. 16, 2011

(51) Int. Cl.
*G06F 17/27* (2006.01)

(52) U.S. Cl.
CPC .................... *G06F 17/27* (2013.01)

(58) Field of Classification Search
CPC ...... G06F 17/27; G06F 17/20; G06F 17/2705;
G06F 17/271; G06F 17/2715; G06F 17/272;
G06F 17/2725; G06F 17/273; G06F 17/2735;
G06F 17/274; G06F 17/2745; G06F 17/275;
G06F 17/2755; G06F 17/276; G06F 17/2765;
G06F 17/277; G06F 17/2775
USPC .......... 704/1–10; 715/264, 261; 707/706–708
See application file for complete search history.

(56) References Cited

U.S. PATENT DOCUMENTS

| | | | | |
|---|---|---|---|---|
| 4,893,238 | A | 1/1990 | Venema | 364/419 |
| 5,517,578 | A | 5/1996 | Altman et al. | 382/181 |
| 5,623,406 | A | 4/1997 | Ichbiah | 395/753 |
| 5,761,689 | A | 6/1998 | Rayson et al. | 707/533 |
| 5,781,891 | A | 7/1998 | Dvorak et al. | 705/2 |
| 5,907,841 | A * | 5/1999 | Sumita et al. | 1/1 |
| 6,014,429 | A | 1/2000 | LaPorta et al. | 379/88 |
| 6,092,034 | A * | 7/2000 | McCarley et al. | 704/2 |
| 6,789,057 | B1 | 9/2004 | Morimoto et al. | 704/2 |
| 6,915,138 | B2 | 7/2005 | Kraft | 455/466 |
| 7,042,443 | B2 | 5/2006 | Woodard et al. | 345/173 |
| 7,257,775 | B1 * | 8/2007 | Jivakov et al. | 715/742 |
| 7,475,343 | B1 * | 1/2009 | Mielenhausen | 715/261 |
| 7,640,233 | B2 | 12/2009 | Baartman et al. | 707/3 |
| 8,275,620 | B2 * | 9/2012 | Paulino et al. | 704/260 |
| 8,526,743 | B1 * | 9/2013 | Campbell et al. | 382/218 |
| 2002/0198716 | A1 * | 12/2002 | Zimmerman | 704/270 |
| 2004/0049498 | A1 | 3/2004 | Dehlinger et al. | 707/3 |
| 2004/0102956 | A1 * | 5/2004 | Levin | 704/2 |
| 2004/0162877 | A1 * | 8/2004 | Van Dok et al. | 709/204 |
| 2005/0156873 | A1 * | 7/2005 | Walter et al. | 345/156 |
| 2005/0171799 | A1 | 8/2005 | Hull et al. | 705/1 |
| 2006/0282856 | A1 | 12/2006 | Errico et al. | 725/46 |
| 2008/0052317 | A1 * | 2/2008 | Francis et al. | 707/104.1 |
| 2008/0281578 | A1 * | 11/2008 | Kumaran et al. | 704/2 |
| 2008/0312911 | A1 * | 12/2008 | Zhang | 704/10 |

(Continued)

OTHER PUBLICATIONS http://www.Abbreviations.com, Abbreviations.com, 2010, p. 1.*

(Continued)

*Primary Examiner* — Lamont Spooner
(74) *Attorney, Agent, or Firm* — Schrantz Law Firm, PLLC; Stephen D. Schrantz

(57) ABSTRACT

The translator allows input of text entries into an input box and displays the translated text in an output box. The user enters text to be translated into an input box. The translator displays the translated text in the output box. The translator utilizes a dictionary to translate the entered text. The user may personalize the dictionary by adding, removing, and/or editing entries and dictionaries into a customizable dictionary. The user may add, remove, and/or edit entries and meanings of the dictionary. The user may also merge multiple dictionaries to create a single customized dictionary. The translator enables the user to save the dictionary for later use, delete a dictionary, and print a dictionary. The user may also send a dictionary to others to assist with translation.

20 Claims, 28 Drawing Sheets

(56) References Cited

U.S. PATENT DOCUMENTS

| | | | |
|---|---|---|---|
| 2009/0019024 A1* | 1/2009 | Heidloff et al. | 707/4 |
| 2009/0099993 A1* | 4/2009 | Seuss | 706/47 |
| 2009/0228787 A1* | 9/2009 | Abe et al. | 715/259 |
| 2009/0234876 A1 | 9/2009 | Schigel et al. | 707/102 |
| 2009/0292693 A1* | 11/2009 | Yang et al. | 707/5 |
| 2010/0177048 A1* | 7/2010 | Semenets et al. | 345/173 |
| 2010/0318361 A1* | 12/2010 | Paulino et al. | 704/260 |
| 2011/0016389 A1* | 1/2011 | Gordon et al. | 715/271 |
| 2011/0307241 A1* | 12/2011 | Waibel et al. | 704/2 |
| 2011/0320548 A1* | 12/2011 | Jonsson | 709/206 |
| 2013/0046544 A1* | 2/2013 | Kay et al. | 704/275 |

OTHER PUBLICATIONS http://www.Abbreviations.com, Abbreviations.com, 2009, p. 1.*
Paralink, Translation2.paralink.com, Feb. 2011, p. 1.*

* cited by examiner

2C-B
nexus
LSD
a-or-acid-or-aeon flux-or-animal-or-barrels-or-battery acid-or-beavis & butthead-or-big d-or-bird head-or-black acid-or-black star-or-...
a-or-acid-or-aeon flux-or-animal-or-barrels-or-battery acid-or-beavis & butthead-or-big d-or-bird head-or-black acid-o-rblack star-...
LSD ⟵ 252
a-bomb ⟵ 252
marijuana cigarette with heroin-or-marijuana cigarette with opium ⟵ 254
a-boot
under the influence of drugs
abandominiums
abandoned row houses where drugs are used
abe
$5 worth of drugs
abe's cabe
$5 bill
abolic
veterinary steroids
ac/dc
codeine cough syrup
acapulco gold
marijuana from South West Mexico
acapulco red-or-afgani indica-or-african-or-african black-or-african bush-or-airplane-or-angola-or-ashes-or-assassin of youth-or-astro turf-or-
acapulco red-or-afgani indica-or-african-or-african black-or-african bush-or-airplane-or-angola-or-ashes-or-assassin of youth-or-astro turf-or-
marijuana from South West Mexico ⟵ 256
marijuana
ace
marijuana-or-PCP ⟵ 258
acid cube
sugar cube containing LSD
acid freak
heavy user of LSD

Fig. 18

| Word | Word Meaning | |
|---|---|---|
| | | Page 1 |
| - | minus | |
| # | number | |
| % | percent | |
| & | and | |
| > | greater than | |
| < | less than | |
| + | plus | |
| = | equals | |
| =BBQ | be back quickly | |
| =FISH | first in, still here | |
| =HAND | have a nice day | |
| =IN | Indiana | |
| =KISS | keep it simple, stupid | |
| =KIT | keep in touch | |
| =OH | Ohio | |
| =OR | Oregon | |
| =SIT | stay in touch | |
| =SLAP | sounds like a plan | |
| =SNAFU | situation normal all fouled up | |
| =SO | significant other | |
| =TOY | thinking of you | |

Fig. 13A

| Word | Word Meaning | Page 2 |
|---|---|---|
| 2THAKE | toothache | |
| A/S/L | age/sex/location | |
| A3 | anytime, anywhere, anyplace | |
| AAF | as a matter of fact | |
| AAK | asleep at the keyboard | |
| AAMOI | as a matter of interest | |
| AAP | always a pleasure | |
| AAR | at any rate | |
| AAS | alive and smiling | |
| ACK | acknowledge | |
| ADD | address | |
| ADN | any day now | |
| ADR | address | |
| AEAP | as early as possible | |
| AFAIK | as far as I know | |
| AFK | away from keyboard | |
| AFPOE | a fresh pair of eyes | |
| AIGHT | alright | |
| AISB | as it should be | |
| AK | Alaska | |
| AKA | also known as | |

192 → Word
196 → Word Meaning
260 → Page 2
270 → AAMOI
272 → as a matter of interest

Fig. 13B

| Word /192 | Word Meaning /196 | /260 Page 3 |
|---|---|---|
| AL | Alabama | |
| ALCON | all concerne | |
| AML | all my love | |
| AOTA | all of the above | |
| AR | Arkansas | |
| ASAP | as soon as possible | |
| ASL | age/sex/location | |
| ASSOC | associate | |
| AT | at your terminal | |
| ATM | at the moment | |
| AWOL | away without leaving | |
| AYEC | at your earliest convenience | |
| AYOR | at your own risk | |
| AYSOS | are you stupid or something | |
| AYTMTB | and you're telling me this because | |
| AZ | Arizona | |
| B/C | because | |
| B/F | boyfriend | |
| B4 | before | |
| B4N | bye for now | |
| BAK | back at keyboard | |

Fig 13C

| Word ←192 | Word Meaning ←196 | ←260 Page 22 |
|---|---|---|
| WV | West Virginia | |
| WWJD | what would jesus do | |
| WWYC | write when you can | |
| WY | Wyoming | |
| WYLEI | when you least expect it | |
| WYSIWYG | what you see is what you get | |
| X | kiss | |
| XLNT | excellent | |
| YA | your | |
| YBS | you'll be sorry | |
| YCMU | you crack me up | |
| YGBKM | you've got to be kidding me | |
| YKWYCD | you know what you can do | |
| YMMV | your mileage may vary | |
| YR | your | |
| YRYOCC | you're running your own cookoo clock | |
| YSYD | yeah sure you do | |
| YW | you're welcome | |
| ZZZ | sleeping (or bored) | |

Fig 13D

TRANSLATOR

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to a translating interface that translates abbreviated text into words, phrases, and/or sentences. The present invention also translates words, phrases, and/or sentences into abbreviated text. The translator utilizes a dictionary to translate the abbreviated text into words, phrases, and/or sentences. The translator also utilizes a dictionary to translate the words, phrases, and/or sentences into abbreviated text. The user may personalize the dictionary by adding, editing, and/or removing entries, meanings, and dictionaries into a customizable dictionary. The user may also merge multiple dictionaries, entries, and meanings into a single dictionary to create a personalized dictionary.

The user adds, edits, and removes entries and meanings to create a customized dictionary. The user may also merge one or more dictionaries to create a single customized dictionary. The present invention also allows a user to create a customized dictionary by including entries and meanings selected by the user. The user may also save the dictionary for later use and send the dictionary to others so that others can translate the user's message.

Each dictionary customizes the translator for a particular user's needs. The dictionary may be customized to include terms related to a user's education, profession, field of interest, hobbies, or any other areas or topics for which a user may need a dictionary. For example, a law enforcement officer may require translation of drug slang language and/or other slang and acronyms into full words or vice versa. A user can add the slang and acronyms and their meanings to the dictionary for translations. The present invention also enables the user to print the dictionary to allow the user to review the dictionary to see entries and meanings to determine if the user needs to add, delete, and/or edit any entries and/or meanings. The user may also review the dictionary on the screen/display to determine if the user should add, delete, and/or edit any entries and/or meanings.

II. Description of the Known Art

Many students, professionals, and other people currently use computing devices such as lap tops, PDAs, mobile phones, or other computers for creating documents for record keeping, note taking, document production, text messaging, sending messages and/or electronic mail, and for producing other records. Such documents require a user to enter a set number of keystrokes to create the document. Because time is of the essence, users search for methods to reduce the time to create such documents.

Patents and patent applications disclosing information relevant are disclosed below. These patents and patent applications are hereby expressly incorporated by reference in their entirety.

U.S. Pat. No. 7,640,233 ("the '233 patent") issued to Baartman, et al. on Dec. 29, 2009 teaches electronic messaging systems, a machine-accessible medium, and methods for text-based electronic communication. In one embodiment taught by the '233 patent, a plurality of databases are provided. The databases taught by the '233 patent each define shorthand terms with one or more longhand terms. A shorthand term taught by the '233 patent is targeted within a text message, and the databases are searched for corresponding longhand terms. The '233 patent teaches that the longhand terms are selected for display according to factors such as user preferences, the identities of participants to the text communication, and the context of the text message. The '233 patent teaches that abbreviations, shorthand, and other jargon sent by one user is thereby interpreted. For example, one of the longhand terms taught by the '233 patent may be substituted in-line with the text message. Alternatively, all matches for the shorthand term found in the databases taught by the '233 patent may be listed in descending order according to relevancy.

U.S. Pat. No. 5,781,891 issued to Dvorak et al. on Jul. 14, 1998 teaches a simplified method of storing and invoking standard phrases during text entry to an electronic computer allows a phrase to be recalled by typing an abbreviated phrase name preceded by a predetermined character string selected from characters of a standard typewriter keyboard, eliminating the interruption typing often incident to finding special function keys. The character string is selected to be unambiguously distinguishable from standard entered text.

U.S. Pat. No. 5,761,689 issued to Rayson et al. on Jun. 2, 1998 discloses a method and word processing system for automatically replacing one or more characters of text entered by a user in a word processing document with the corresponding plain text, formatted text, or other object. The '689 patent discloses a method for automatically replacing an entry made by a user in a computer display with a replacement. The method begins with the step of enabling the user to indicate the entry that will be automatically replaced and then stores the indication. The user is also enabled to identify the replacement that will automatically replace the entry so that the identification of the replacement will be stored in relationship to the entry. Characters entered by the user are scanned to detect if the user has entered the characters comprising the entry, and to determine if a delimiter character was entered after the characters comprising the entry. The entry is automatically replaced with the replacement.

U.S. Pat. No. 4,893,238 issued to Venema teaches a text processing device for stenographic typing that comprises an alphanumerical keyboard, a translation device, a read/write memory and a display device. Given, frequently occurring words can be entered into the device in abbreviated form. Words of a main set are entered by way of a sequence of two or more key strokes. At least the first two thereof each define a word part to be separately pronounced, for example, in that they constitute the first letters of respective syllables. The full word corresponding to an abbreviated word is formed by the translation device in that at least one missing letter is inserted each time between two successively entered letters. By also providing one or more smaller auxiliary sets of abbreviations, there is an overall saving as regards the number of key strokes required to enter a text.

U.S. Pat. No. 5,623,406 issued to Ichbiah on Apr. 22, 1997 teaches a system for very fast entry of text into a computer. The system uses a current glossary, which may be custom generated to reflect common phrases and words pertaining to any specific subject matter, as a source for retrieving words and phrases from abbreviations. The '406 patent teaches multiple glossaries each of which is of interest to one of the system users. For instance, in a law firm there may be multiple lawyers who specialize in patent law, family law, and corporate law. Each group of lawyers would have their own glossary, or series of glossaries, which contain words and phrases which are commonly referenced in their specialty.

U.S. Pat. No. 6,915,138 issued to Kraft on Jul. 5, 2005 ("the '138 patent") teaches a message exchange handling concept. The '138 patent teaches that a user may according to this embodiment be offered an option to save the chat history as a text string so the text string may be used in another application, and e.g. forward it to a third person.

U.S. Publication No. 20090234876 ("the '876 publication") to Schigel on Sep. 17, 2009 teaches systems and methods to enhance relevancy efficiency of content sharing within a meta-community through content recommendation and recipient recommendation. The systems and methods taught by the '876 publication analyze sharing activities within the meta-community, both of members and of un-registered users through member sharing interactions, to create sharing preference profiles for members and un-registered users.

Certain problems exist with the aforesaid known art. The known art does not allow the flexibility and options provided by the present invention. The present invention provides a translator that decreases the amount of time required to enter text. The present invention improves the speed and increases the user's efficiency of entering text to increase the user's efficiency. The present invention also translates the abbreviated text into full words, phrases, and/or sentences to allow the user to easily read the entered text. The present invention translates the full words, phrases, and/or sentences to the abbreviated text. The abbreviated text allows a user to view the abbreviated message on a smaller display allowing the user to more easily read the full contents of the message. The present invention also allows the user to customize a dictionary according to the user's needs and/or preferences.

Therefore, the present invention is needed to provide a unique translator that enables a user to quickly enter text and provide a customized translation of the text to either abbreviate the message or to provide the message without the abbreviations depending on the user's desired output.

SUMMARY OF THE INVENTION

The present invention relates to a translating interface that translates abbreviated text into words, phrases, and/or sentences. The present invention also translates words, phrases, and/or sentences into abbreviated text. The translator utilizes a dictionary to translate the abbreviated text into words, phrases, and/or sentences. The translator also utilizes a dictionary to translate the words, phrases, and/or sentences into abbreviated text. The user may personalize the dictionary by adding, removing, and/or editing entries and dictionaries into a customizable dictionary. The user may add, remove, and/or edit abbreviated text, words, phrases, and sentences of the customized dictionary. The user may also merge multiple dictionaries to create a single customized dictionary. The user may also create a customized dictionary by including only those entries desired by the user. The translator enables the user to save the dictionary for later use. The user may also send a dictionary to others for translating. The translator also provides print functions that enable a user to print a selected dictionary for review. The user may use the printed dictionary to become more familiar with the dictionary to quicken text entry. The user may also review the printed dictionary to determine any additions, edits, and/or deletions to the entries and/or meanings of a selected dictionary.

The dictionary customizes the translator for each specific use of the translator. The dictionary may be customized to include terms related to a user's curriculum, education, course work, profession, field of interest, or any other areas or topics. The user may also customize the dictionary for the user's specific needs and/or tendencies. For example, a user in the health care field may require translation of medical acronyms into full words or vice versa. The dictionary allows the user to add those acronyms and their meanings to the translation process.

The present invention utilizes a hardware configuration to enable a user to enter information, view the information, and translate the information. The hardware configuration includes a display, an input device, a computing device, and storage. The hardware configuration may also include a printer if needed. In one embodiment of the present invention, the translator may be connected to a network 105 allowing the user to transmit and receive information across the network. The information can include dictionaries, output text, input text, etc. The present invention utilizes a user interface implemented in both hardware and software. An input device, such as a touch screen, a mouse, a keyboard, or other known input devices for entry of text enables the user to enter text. The text may include at least one character, string, alphanumeric character, or other input.

The hardware of the present invention may include a processing system such as a computer or computer system that provides a display that shows video, text, images, and/or other visual representations. The display of the information shows the text being entered and also shows the translation of the entered text.

Software:

The present invention includes software installed on a computing device. The software enables the user to enter text. The software searches the text entered by users for matches found in the dictionary. The software then displays the matched text with its corresponding information found in the loaded dictionary.

The present invention provides an added benefit over the known art. The known art replaces the entered text. The present invention displays both the entered text and the translated text. The present invention enables the user to view both versions of the text so that the user can gain a better understanding of the translation. The present invention also enables the user to edit the entered text according to how it was originally entered. The known art only allows the user to edit the translated text. The known art limits the user because the user may not know the text as it was originally entered. Therefore, the user would have greater difficulty in editing the text because the user may not be as familiar with the translated text as the text that was originally entered by the user.

After the translator outputs the text, the user may save the output text for future reference and recall to add additional notes.

It is an object of the present invention to increase the speed with which a user may enter text.

It is another object of the present invention to enable a user to translate the text to a meaning.

It is another object of the present invention to enable a user to translate the text to an entry.

It is another object of the present invention to increase the efficiency with which a user may enter text.

It is another object of the present invention to assist users in comprehending abbreviated text.

It is another object of the present invention to reduce the length of text by using abbreviations to communicate.

It is another object of the present invention to reduce the amount of text for displaying the text on a smaller display such as a smart phone to allow the user to view the text and reduce scrolling through the text.

It is another object of the present invention to increase a user's comprehension of slang that the user may not have initially understood prior to using the invention.

It is another object of the present invention to inform users of the current slang being used by others.

It is another object of the present invention to allow parents to monitor language being used by their children to understand activities in which their children may be involved.

It is another object of the present invention to enable enforcement agencies to interpret the latest lingo used by others in order to better monitor potentially illegal activities.

It is another object of the present invention to increase the efficiency of data entry.

It is another object of the present invention to reduce typographical errors and misspellings caused by user error.

It is another object of the present invention to create a more consistent data entry system.

It is another object of the present invention to provide a note taking system to enable the user to quickly take notes.

It is another object of the present invention to enable the user to save the text displayed in the output box for future reference.

It is another object of the present invention to enable professionals to better monitor professionally related texting of their clients/patients.

It is another object of the present invention to enable medical, paramedics, and therapists to better monitor medically related texting of their clients/patients.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 12 is a view of one dictionary of the present invention;

FIGS. 13A-13D are views of one dictionary of the present invention; and

DETAILED DESCRIPTION

Figure 1:
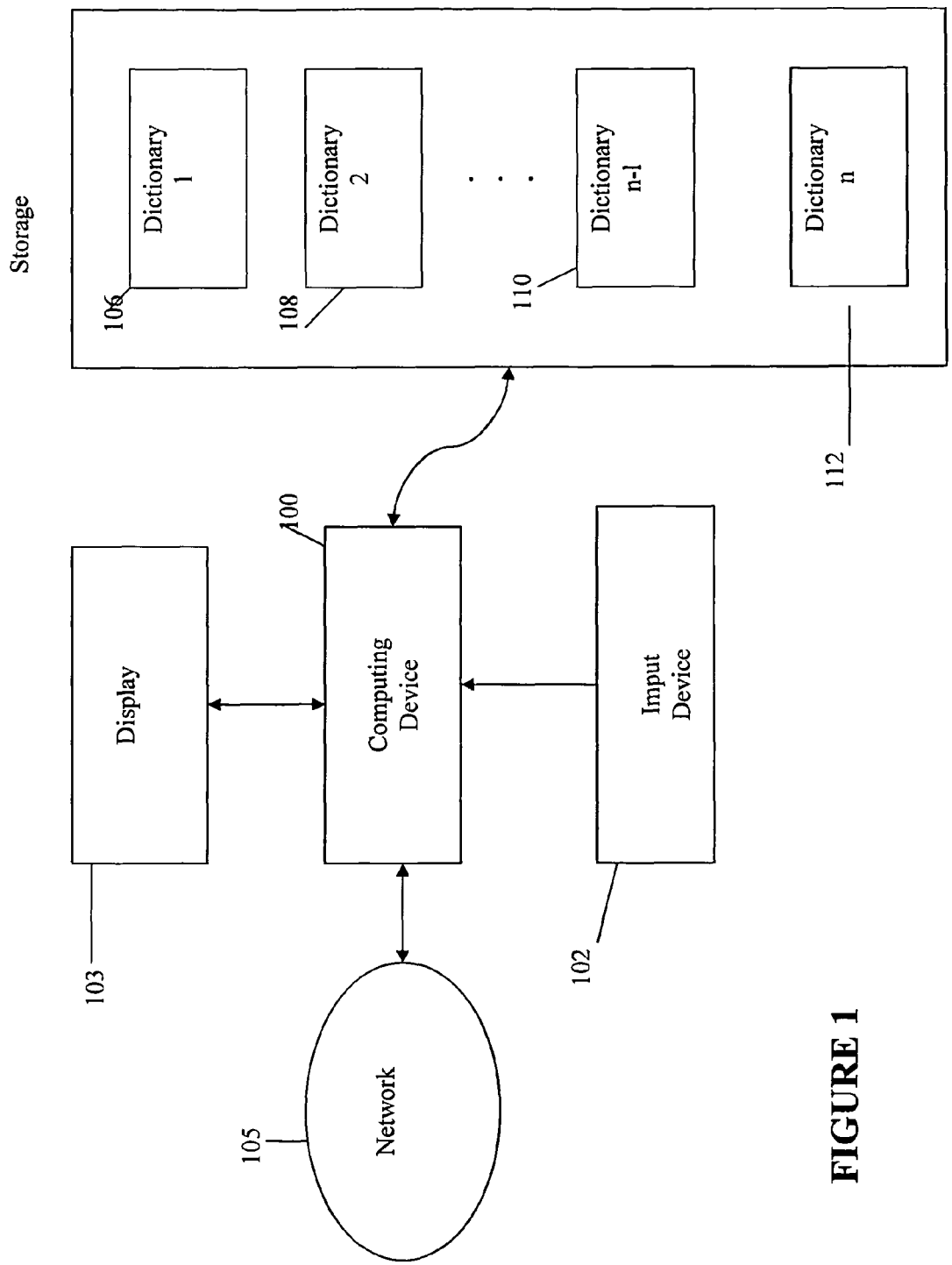
FIG. 1 is an environmental view of one embodiment of the present invention.

FIG. 1 illustrates a diagram of one embodiment of the interface system for use in the translating device of the present invention. The interface system provides access to a data storage on which the dictionaries can be stored. Through a user's interaction with the interface system, the user may expand text or abbreviate depending on the user's desired output.

The interface system, as shown, includes a computing device 100, having a processor attached to memory, e.g., random access memory (RAM), and electronic storage media such as a hard disk or online storage. The processor controls the operation of the display 103 and processes any information provided by a user. In one embodiment, the display may be a touch screen display or a display, such as a monitor that does not accept input. In such an embodiment utilizing a display, a customer enters input using an input device such as a touch screen, a mouse, a track ball, a track pad including the track pads found on Blackberry® phones, a button input system, a keyboard, an audio input system, and/or other known input systems that enable a user to enter text, characters, or other input.

Although not illustrated, the processor is at least one component of a large computing system or device 101 that includes all the necessary input and output hardware and software necessary to communicate with the various other components such as the display, camera, speaker, input device, storage, etc.

Continuing to refer to FIG. 1, a user enters instructions or text via the touch screen display or other known input device 102 when using the translator 100. As stated above, the computing device 101 may be a computer, a smart phone, a tablet pc, etc. The computing device 101 includes an input device 102, such as a touch screen display, keyboard, mouse, or other known input devices, to enable the customer to enter information, instructions, and text.

The computing device 101 also includes a display 103 to enable the user to view the text and enter the appropriate information, characters, and instructions. The display 101 provides text, visual representations, images, and video to the user/customer to instruct the user and to provide the user with information.

Figure 10:
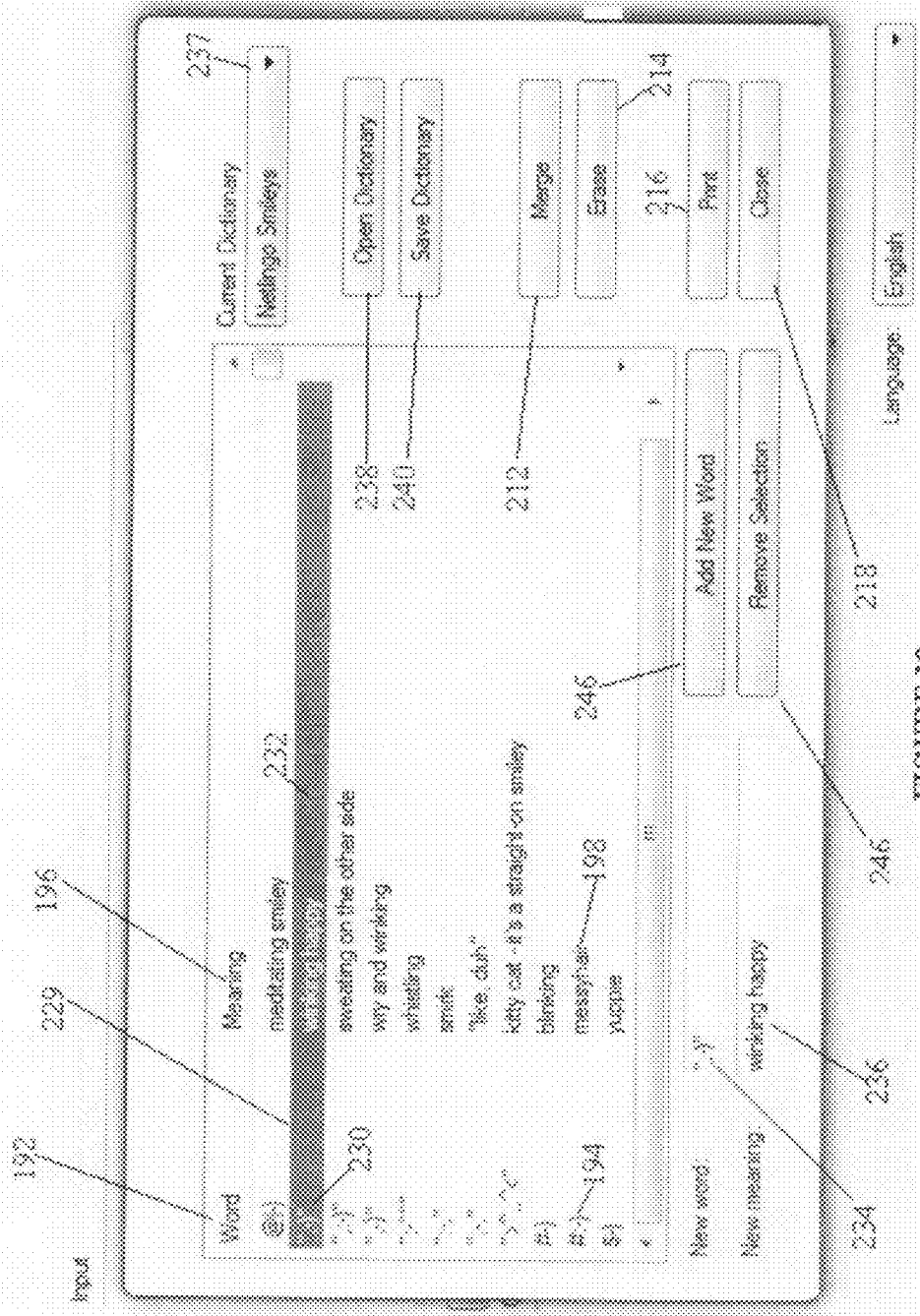
FIG. 10 is another view of one embodiment of the present invention.

The computing device 101 communicates with storage 104 such as a hard drive, flash drive, optical disc such as a compact disc (cd) or digital versatile disc (dvd), tape, online storage, or other known storage mediums. The dictionaries 106, 108, 110, 112 are stored on storage 104 that enables the user to translate the text. As shown in FIG. 1, the present invention allows multiple dictionaries to be stored and loaded accordingly. Referring to FIG. 10, the dictionary provides at least one dictionary entry 192 and at least one meaning 196. The translator of the present invention utilizes the dictionary for translating the text as will be described below. Depending on the desired output, the translator searches for entries 192 or meanings 196 to display either expanded text or abbreviated text. In another embodiment, the translator displays either the entries 192 or meanings 196 associated with the entered text.

To reduce the time needed to enter text, the translator enables a user to input entries 192 such that the translator shows the entered text in the input box and displays the meanings 196 associated with the matched entries 192 in the output box. On the other hand, the user may want to output an abbreviated version. In such an instance, the translator displays the entered text in the input box and the entries 192 associated with the matched meanings 196 in the output box.

Figure 2:
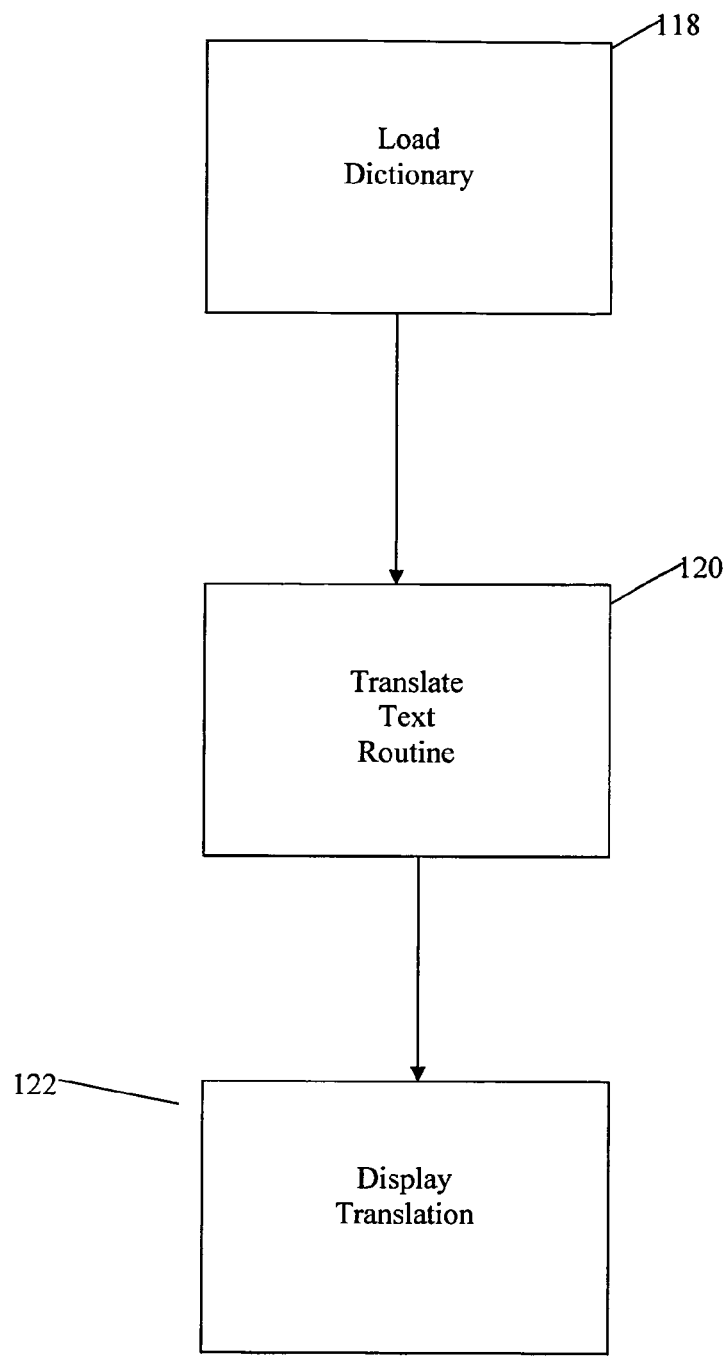
FIG. 2 is a flowchart showing one routine of one embodiment of the present invention.

FIG. 2 shows the routine of the present invention in which a user may translate the text. To enable the translator routine to operate correctly, the user must load a dictionary into the translator. The user may load a previously stored dictionary or the user may create a dictionary for the translation. The user loads a dictionary by accessing the dictionary menu by selecting the Dictionary Selection Button 176 shown in FIG. 7 which displays Dictionary Window 190 shown in FIG. 10. FIG. 7A shows another embodiment of the present invention in which the translator identifies the current dictionary at loaded dictionary 173.

In one embodiment, the translator automatically selects the dictionary that the user used most recently for translating. In another embodiment, the translator selects the dictionary to be used by default. In another embodiment, the user may select a default dictionary that the translator will automatically use in displaying the output text in output box. As shown in FIG. 10, dictionary entry 194 corresponds with meaning 198 stored within the dictionary. Continuing to refer to FIG. 2, the dictionary must be loaded in order for the translation to occur.

At dictionary loaded query 116, the present invention determines the loaded dictionary. The translator then proceeds to Translate Text Routine 120. The user enters text into input box to be translated at the Translate Text routine 120. The translator either translates the text entered into input box into an abbreviation or the longhand terms depending on the user's selected translation. The translator then displays the translation at Display Translation 122.

Figure 3:
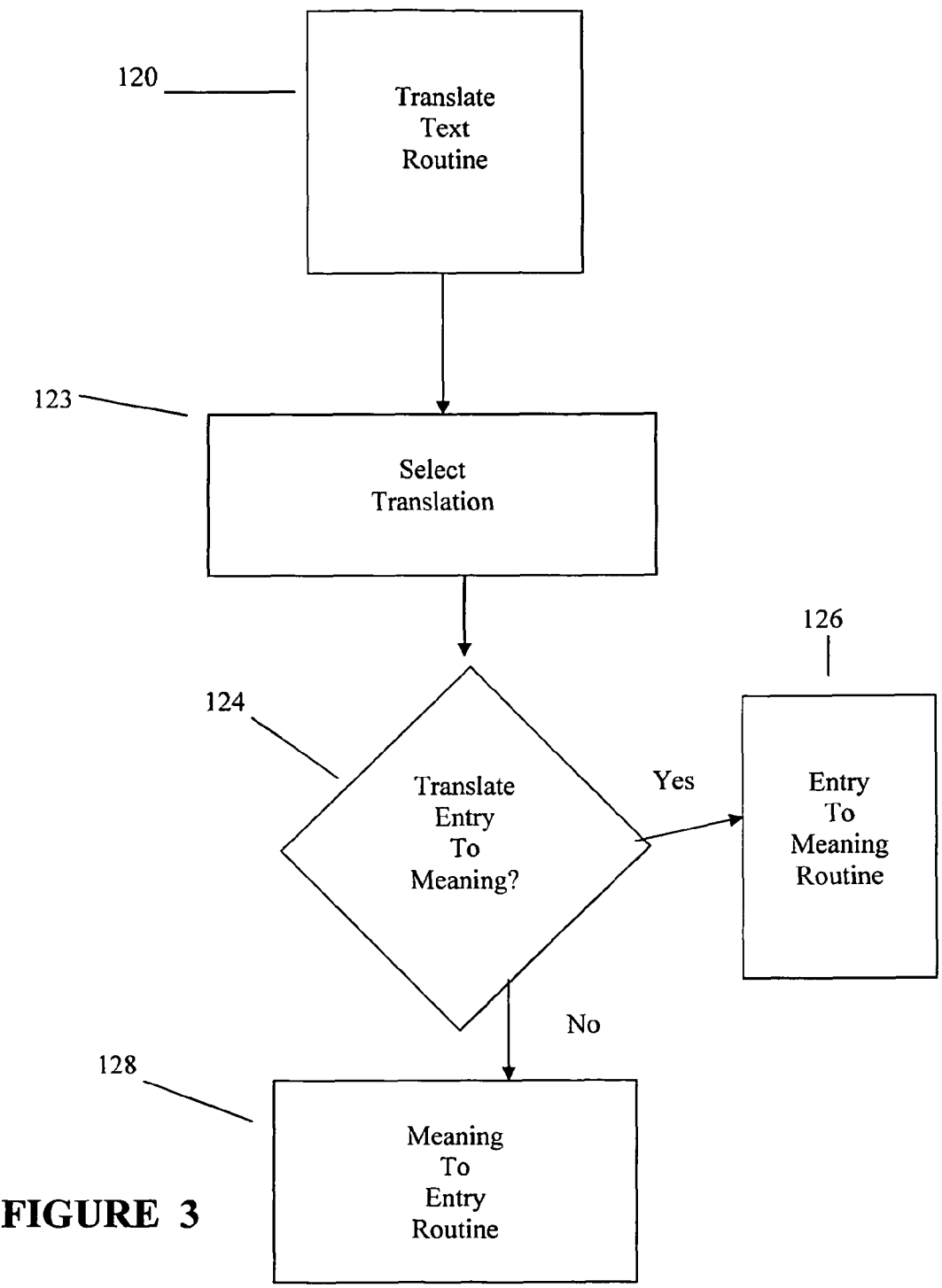
FIG. 3 is another flowchart showing one routine of one embodiment of the present invention.

FIG. 3 shows the Translate Text Routine 120 in greater detail. The user defines the type of translation to occur at Select Translation 123. The user selects whether the translator will perform an entry to meaning translation or a meaning to entry translation. The translator determines the type of translated at Translation Selection Query 124. If the user selects to translate entries to meanings, the translator performs Entry to Meaning Routine 126. If the user selects to translate meanings to entries, the translator performs Meaning to Entry Routine 128.

Figure 4:
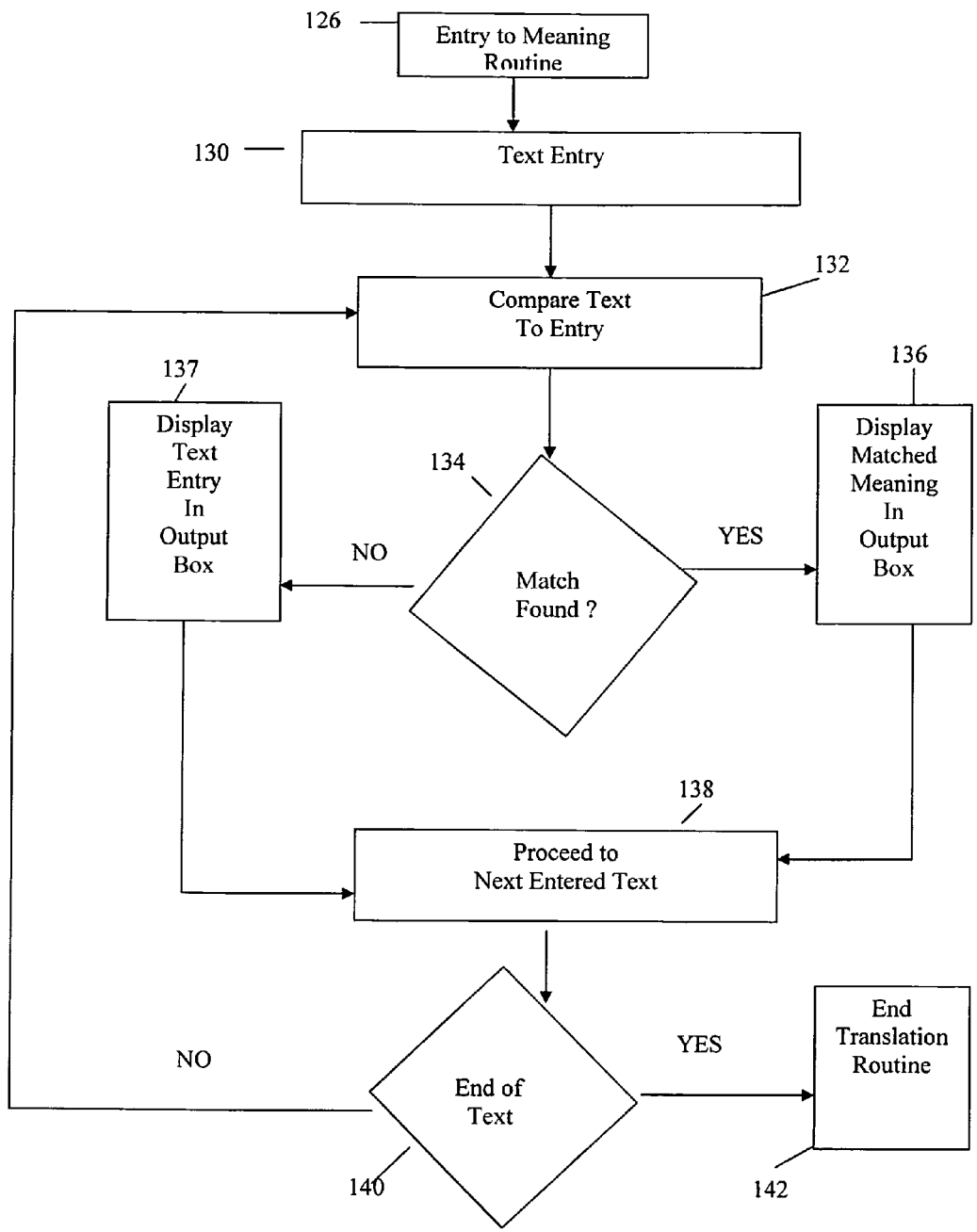
FIG. 4 is another flowchart showing one routine of one embodiment of the present invention.

Entry to Meaning Translation 126, shown in FIG. 4, enables the user to enter entries 192 to be translated to meanings 196. The user enters text into input box 164 at Text Entry Step 130. The translator does not change the contents of the input box 164. However, the user may edit the text found within input box 164. The translator compares the entered text to the entries 192 in the loaded dictionary or dictionaries at Compare Text to Entry Step 132. In one embodiment that translates text as the user enters the text, the translator compares the characters of the entered text to the characters of the entries 192 and informs users of the meanings 196 associated with the matched entries 192. If multiple meanings are stored in the dictionary for the matched text entry, the translator displays all of the meanings associated with the matched entry. The user may then select one of the several meanings to be displayed in output box 166. If only one match is found, the translator displays the meaning 196 associated with the matched dictionary entry 192 in the output box 166.

In another embodiment that translates as the text is entered, the translator searches for a delimiter. Delimiters indicate the end of a character string. The delimiter may include such characters as a space character, a comma, other punctuation, or a combination thereof. When the translator detects a delimiter, the translator compares the entered text to the entries 192.

When the translator compares the text entered into input box 164 to entries 192, the translator searches the loaded dictionary for matched entries at Match Found Query 134. The translator displays in output box 166 the meaning 196 associated with the entry that matches the text entered in input box 164 at Display Matched Meaning Step 136 if a match is found. If multiple meanings are associated with a matched entry, the translator displays the multiple meanings to the user. The user then selects the appropriate meaning associated with the matched entry. The translator translates the entered text to the meaning selected by the user and displays the selected meaning in output box 166. The translator may display a meaning 196 in output box 166 before the user completes the entered text in input box 164. To change the text displayed in output box 166, the user continues entering text into input box 164 for the appropriate text to be displayed in output box 166. The translator then proceeds to the next character string of the entered text at Proceed to Next Entered Text Step 138.

If a match is not found at Match Found Query 134, the translator displays the entered text in output box 166 at Display Text Entry in Output Box 137 as the text was entered in input box 164. The translator then proceeds to the next entered text at Proceed to Next Entered Text Step 138. The translator does not replace character strings or text that does not match an dictionary entry 192 within the loaded dictionary. In such instances, the entered text appears in output box 166 the same as it was entered by the user in input box 164.

The translator continues to translate the entered text to corresponding meanings 196 of the entries 192 that match the entered text for display in output box 166 while the user continues to enter text in input box 164. If the user has completed entering text at End of Text Query 140, the translator completes the translation routine at End Translation Routine 142. If the user has not completed entering text, the translator will continue to compare the entered text to the entries 192 to display within output box 166 the entered text with the corresponding meanings 196 of the text that matches the entries 192. In another embodiment, the translator may find an end of file designation at End of Text Query 140. If the translator finds the end of file designation, the translator completes the translation routine at End Translation Routine 142.

Figure 5:
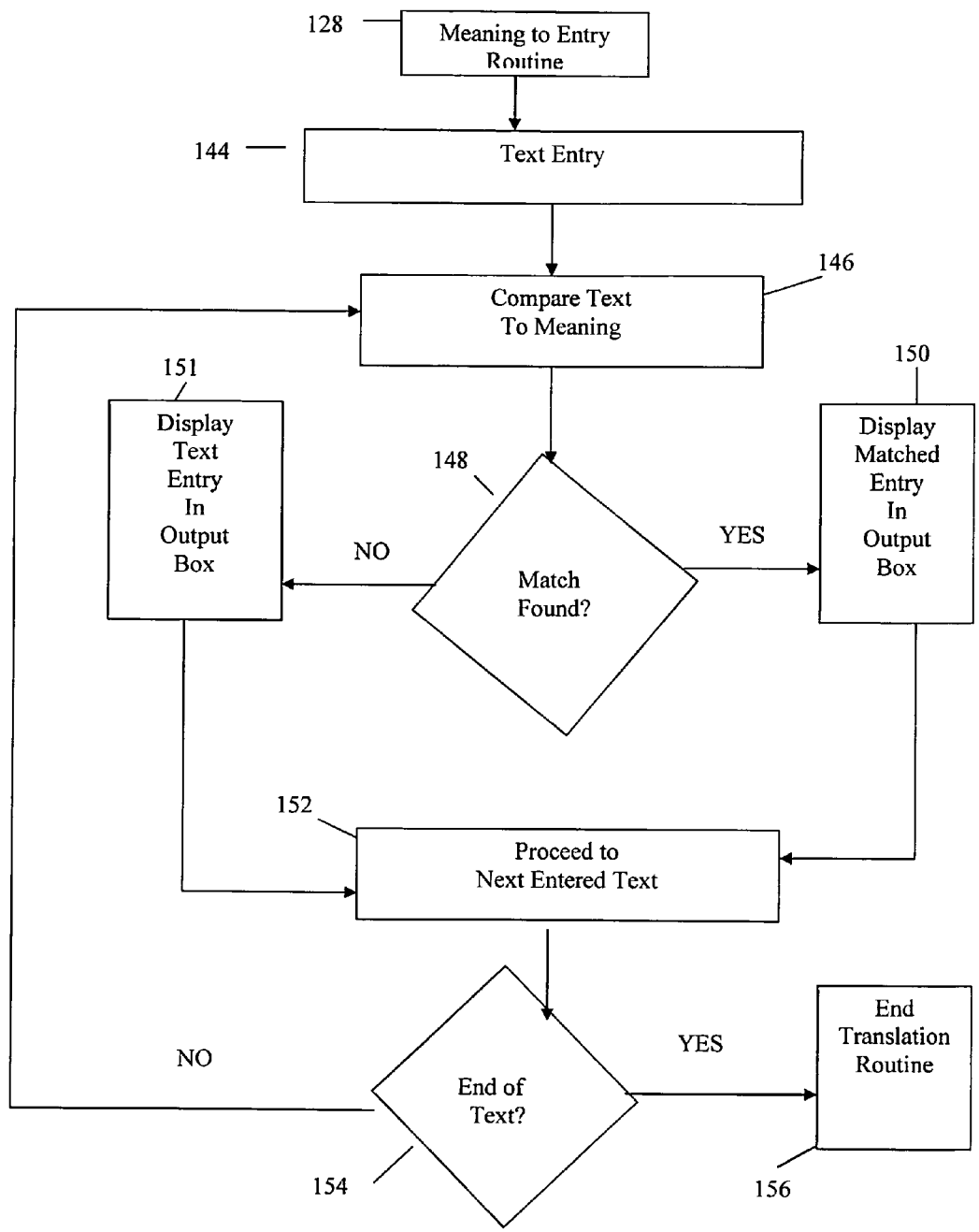
FIG. 5 is another flowchart showing one routine of one embodiment of the present invention.

Meaning to Entry Translation 128, shown in FIG. 5, enables the user to enter meanings 196 to be translated to entries 192. The user enters text into input box 164 at Text Entry Step 144. The translator does not change the contents of the text found within input box 164. However, the user may edit the text found within input box 164. The translator compares the entered text to the meanings 196 in the loaded dictionary or dictionaries at Compare Text to Meaning Step 146. In one embodiment, the translator compares the characters of the entered text to the meanings 196 and informs users of the entries 192 associated with the matched meanings 196. If multiple entries 192 are stored in the dictionary for the matched text entry, the translator displays all of the entries 192 associated with the matched meanings 196. The user may then select one of the several entries to be displayed in output box 166. If only one match is found, the translator displays the dictionary entry 192 associated with the matched meaning 196 in the output box 166.

In the embodiment that translates as the text is entered, the translator searches for a delimiter. Delimiters indicate the end of a character string. The delimiter may include such characters as a space character, a comma, a period, other punctuation, or other combination. When the translator detects a delimiter, the translator compares the entered text to the meanings 196.

When the translator compares the text entered in input box 164 to meanings 196, the translator searches the loaded dictionary for matches at Match Found Query 134. The translator displays within output box 166 the dictionary entry 192 associated with the matched meaning entered in input box 164 at Display Entry Step 150 if a match is found. If multiple entries are associated with a matched meaning, the translator displays the multiple entries to the user. The user then selects the appropriate entry associated with the matched meaning to be displayed in output box 166. The translator displays the selected entry in output box 166. The translator then proceeds to the next character string of the entered text at Proceed to Next Entered Text Step 152. The translator may display a dictionary entry 194 in output box 166 before the user completes the entered text in input box 164. To change the text displayed in output box 166, the user continues entering text into input box 164 for the appropriate text to be displayed in output box 166.

If a match is not found at Match Found Query 148, the translator displays the entered text in output box 166 at Display Text Entry in Output Box 151 as the text was entered in input box 164. The translator then proceeds to the next entered text at Proceed to Next Entered Text Step 152. The translator does not replace character strings or text that does not match a meaning 196 within the loaded dictionary. In such instances, the entered text appears in output box 166 the same as it was entered by the user in input box 164.

The translator continues to translate the character strings with the corresponding entries 192 of the matched meanings 196 for display in output box 166 while the user continues to enter text into input box 164. If the user has completed entering text at End of Text Query 140, the translator completes the translation routine at End Translation Routine 142. If the user has not completed entering text, the translator will continue to compare the entered text to the meanings 196 to display within output box 166 the corresponding entries 192 of the entered text of input box 164 that matches the meanings 196. In another embodiment, the translator may find an end of file designation at End of Text Query 154. If the translator finds the end of file designation, the translator completes the translation routine at End Translation Routine 156.

Figure 6:
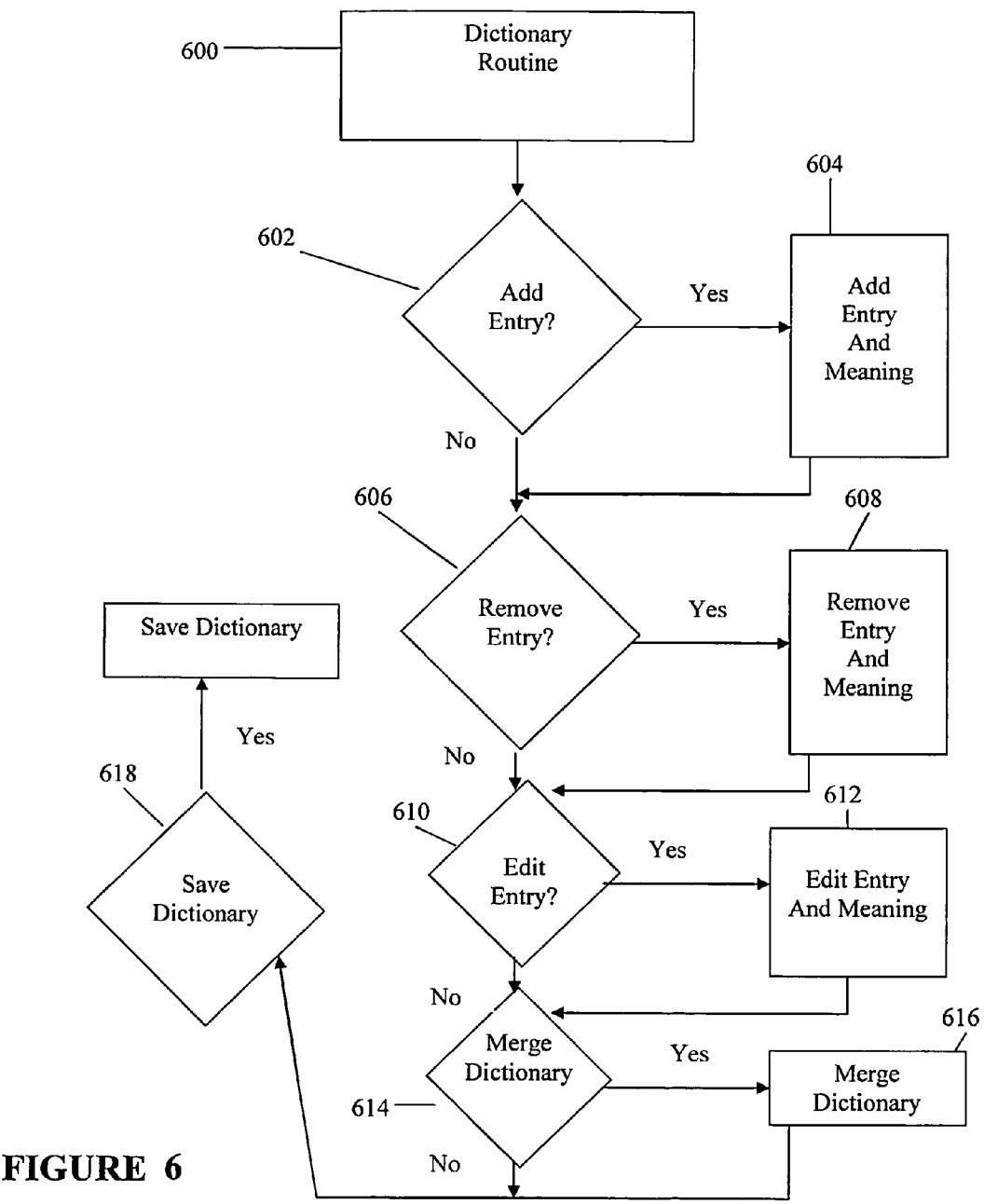
FIG. 6 is another flowchart showing one routine of one embodiment of the present invention.
Figure 6A:
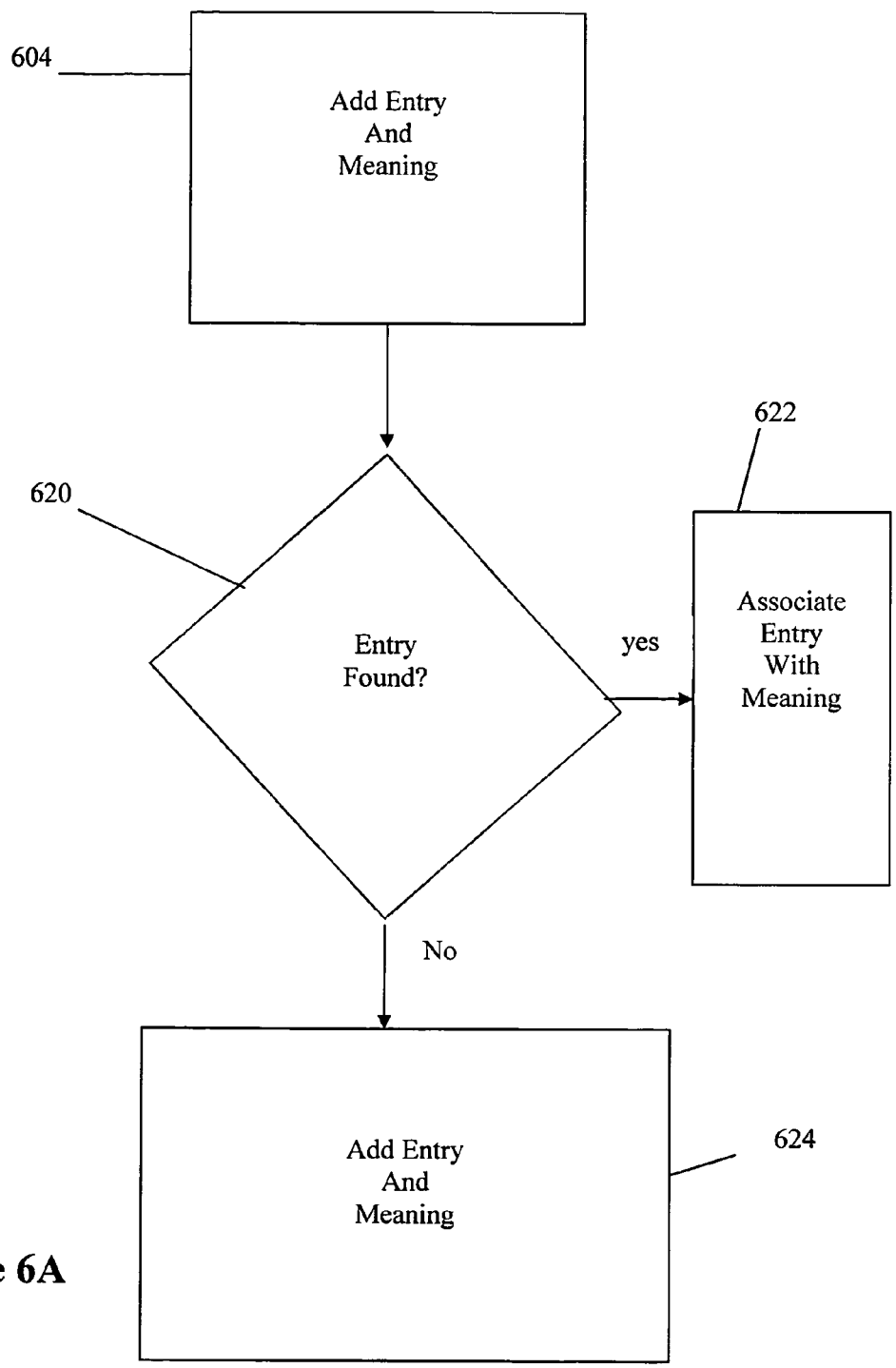
FIG. 6A is another flowchart showing one routine of one embodiment of the present invention.

FIG. 6 shows the Dictionary Routine 600 by which a user creates a dictionary. The user may load a dictionary and edit the dictionary as needed. The user may create a new dictionary by adding entries, removing entries, editing entries, and/or merging dictionaries. The user may select to add an entry at Add Entry Query 602. The user adds an entry and a meaning to the current dictionary at Add Entry and Meaning Step 604. A user may develop a personalized dictionary by using a database program such as Excel, Excel, My SQL, or other database program. The user may add an entry as seen in FIG. 6A. If the entry is already present in the current dictionary, the user associates the meaning with the entry. The translator searches for the entry to determine if the entry is stored within the dictionary at Entry Found Query 620. If the entry is found at Entry Found Query 620, the dictionary associates the meaning with the entry at Associate Meaning Step 622. The new meaning is appended to the previously stored meaning associated with the entry found within the dictionary. The dictionary will provide multiple meanings for the selected entry when multiple meanings are associated with an entry. The dictionary will add a new entry and meaning associated with the entry at Add Entry and Meaning Step 624 if the entry is not found at Entry Found Query 620.

Continuing to refer to FIG. 6, the user may also remove an entry at Remove Entry Query 606. The user removes the selected entry and meaning from the current dictionary at Remove Entry and Meaning Step 608. When removing an entry, the translator deletes the entry and all meanings associated with the entry from the dictionary.

Figure 6B:
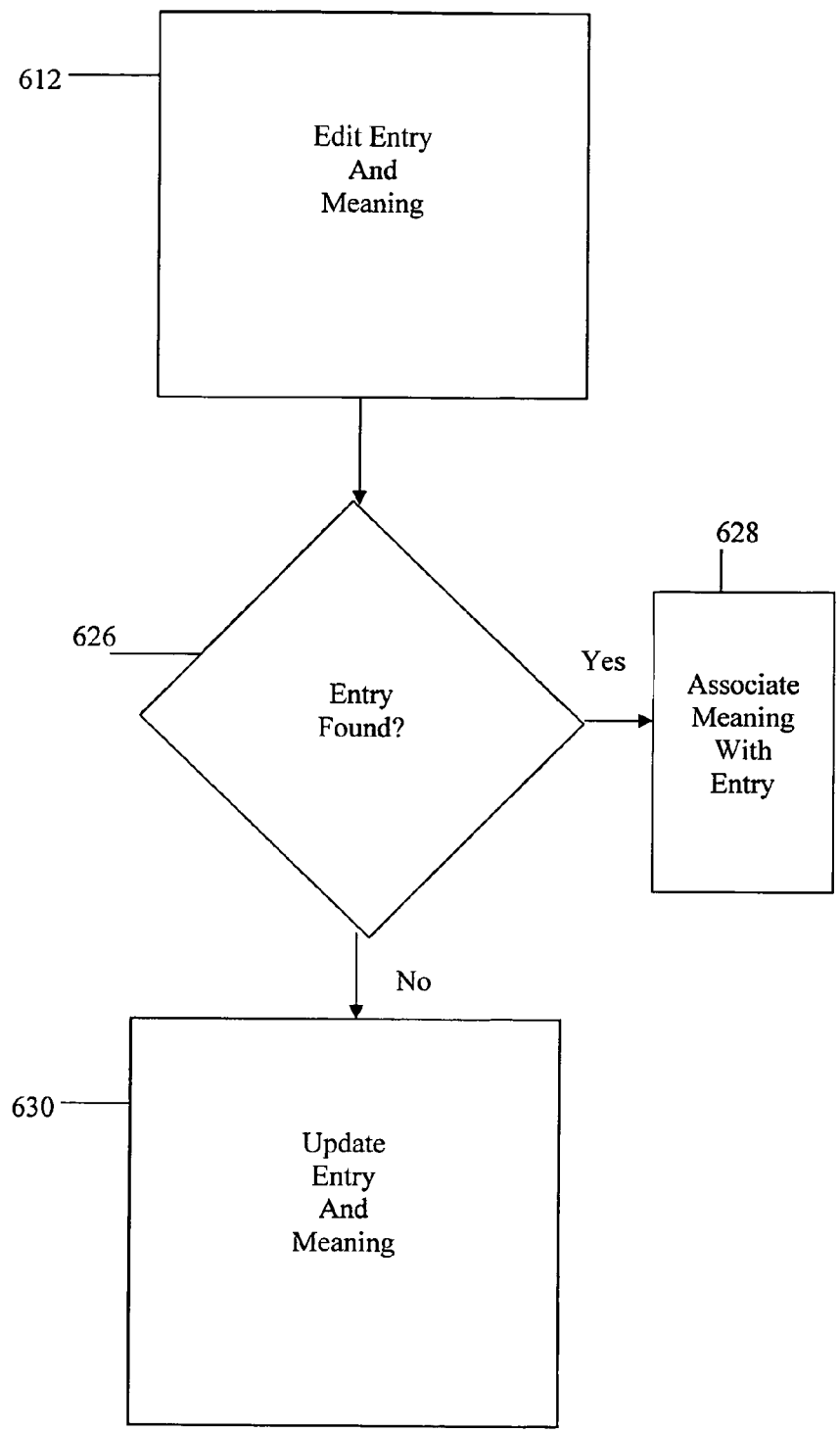
FIG. 6B is another flowchart showing one routine of one embodiment of the present invention.

The user may also edit entries at Edit Entry Step 612 when selecting to edit an entry at Edit Entry Query 610. When editing an entry, the user may edit an entry or the meaning associated with an entry of the current dictionary. The user may also edit both the entry and the meaning at Edit Entry and Meaning Step 612. The user may edit an entry and/or meaning as seen in FIG. 6B. If the entry is found at Entry Found Query 626, the dictionary associates the meaning with the entry at Associate Meaning Step 628. The user may edit the meanings associated with the entry. The user may add new meanings, remove existing meanings, and edit the existing meanings within the dictionary. If the user adds a new meaning, the new meaning is appended to the previously stored meaning found within the dictionary such that the dictionary will provide multiple meanings for the entry. If the user erases a meaning from the existing entry, the user selects the meaning to be deleted and removes the meaning associated with the entry. The translator removes the deleted meaning from the dictionary. The user may also edit meanings associated with an entry. The user edits the meanings and the translator associates the updated meanings with the entry.

Figure 6C:
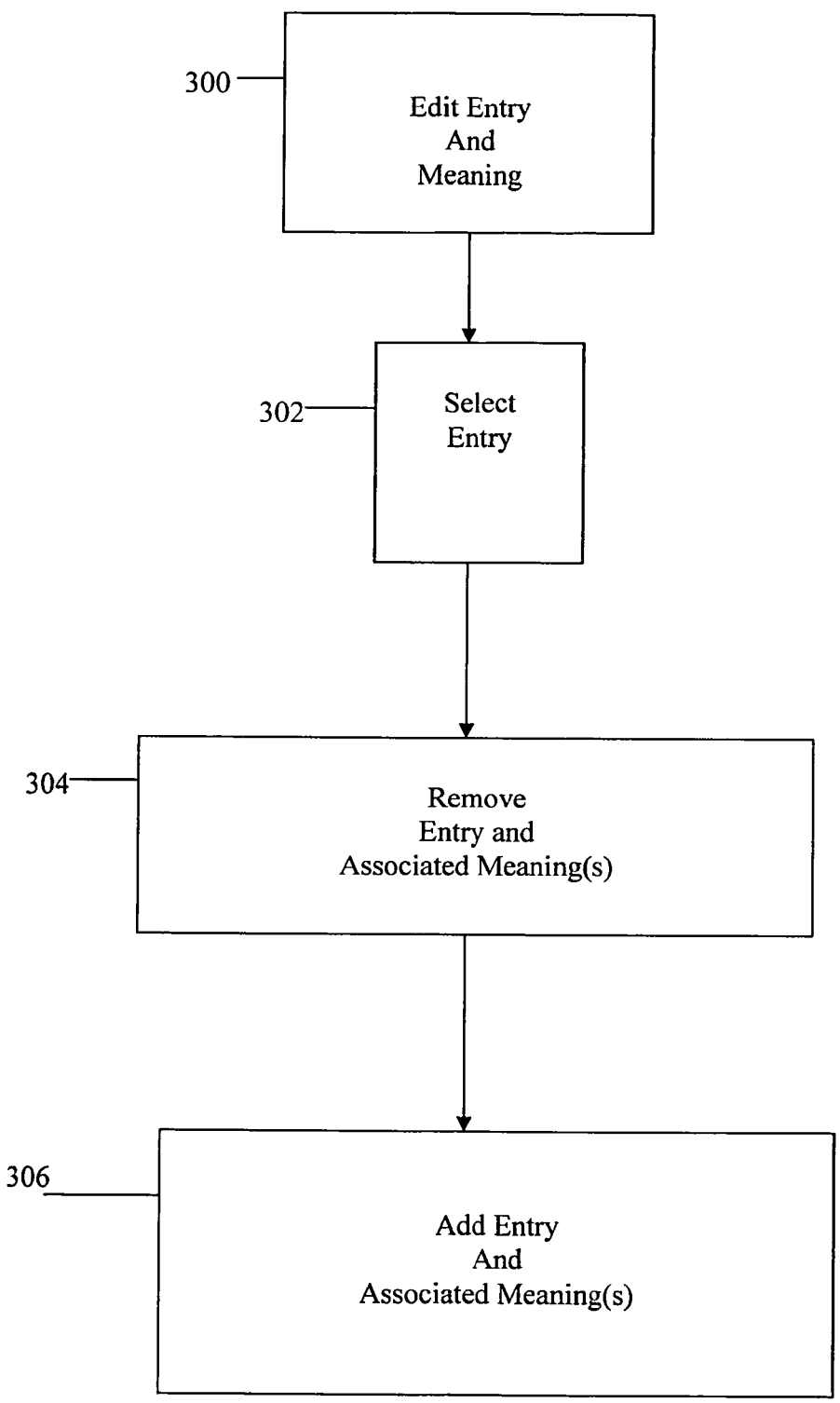
FIG. 6C is another flowchart showing one routine of one embodiment of the present invention.

The user may also edit the entries found within the loaded dictionary. If the entry is not found at Entry Found Query 626, the translator adds a new entry and meaning associated with the entry at Update Entry and Meaning Step 630. The translator will also remove the previously identified entry and associated meanings from the dictionary as it was identified in the dictionary prior to the user editing the entry. If the new entry is found in the dictionary, the translator updates the entry to include the new meanings associated with the entry. In another embodiment of the present invention shown in FIG. 6C, the user edits an entry and meanings by removing the entry and adding a new entry as shown in Edit Entry and Meaning Routine 300. The user selects an entry and its associated meanings to be edited at Select Entry Step 302. The user selects remove selection 246 to remove the entry and associated meaning(s) at Remove Entry and Associated Meaning(s) Step 304. The user then enters a new entry and meaning(s) into entry box 234 and meaning box 236 to be added to the current dictionary at Add Entry and Associated Meaning(s) Step 306.

Figure 6D:
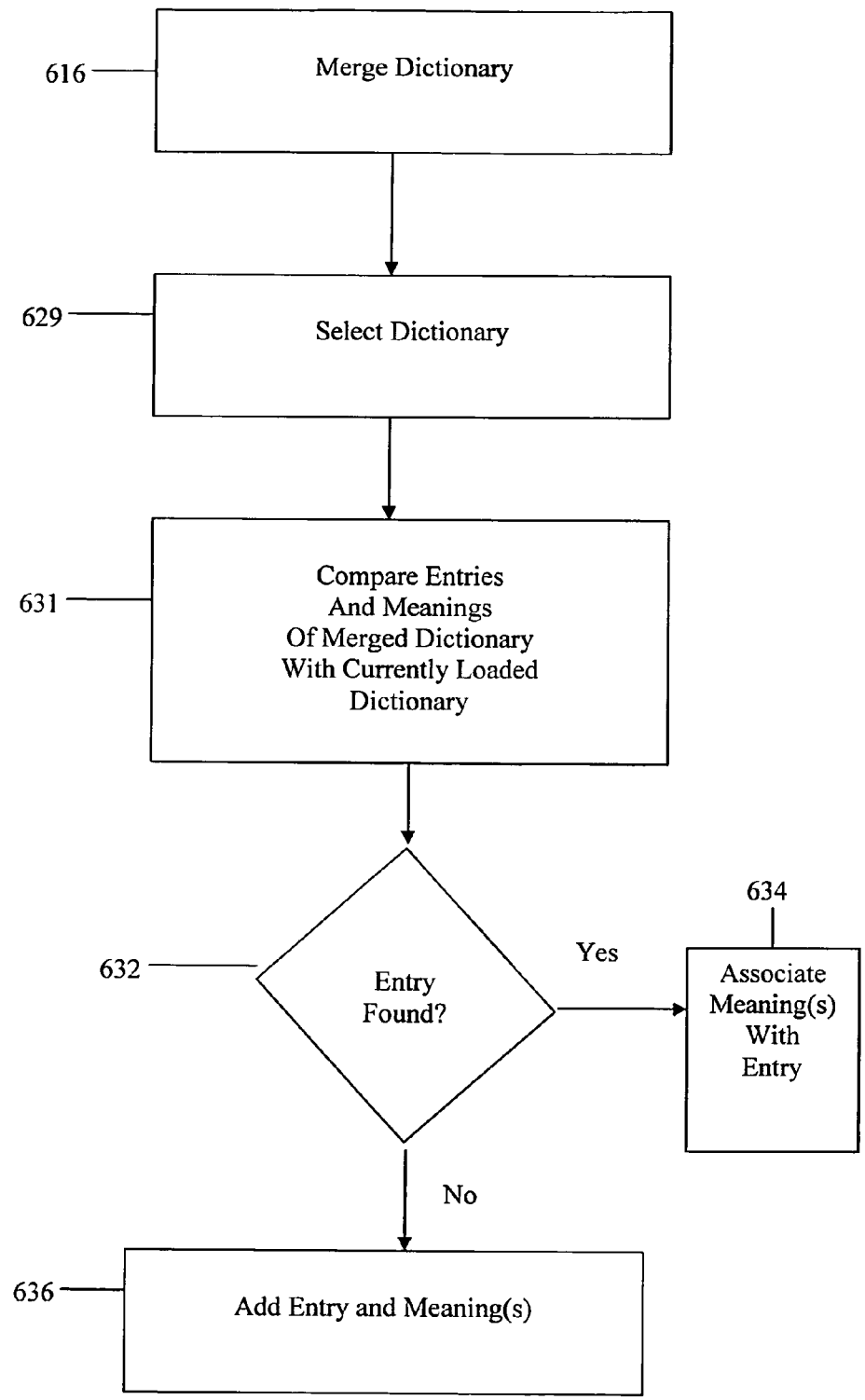
FIG. 6D is another flowchart showing one routine of one embodiment of the present invention.

Different dictionaries may be stored in storage associated with different uses. The user may also add additional dictionaries to the current dictionary. The user may merge one or more stored dictionaries to the current dictionary to increase the entries and meanings to the current dictionary at Merge Dictionary Routine 616 if the user selects to merge a dictionary at Merge Dictionary Query 614. The translator merges the dictionary with the current dictionary as shown in FIG. 6D. When merging dictionaries, the translator updates the current dictionary to include the entries and meanings of the dictionary to be merged. The user selects the dictionary to be merged with the current dictionary at Select Dictionary 629. The translator adds all of the entries and meanings of the merged dictionary to the current dictionary. The translator compares the entries and meanings to determine if the entry and/or meaning(s) of the merged dictionary are currently stored in the loaded dictionary at Step 631. If the entry is already present in the current dictionary, the translator associates the meaning(s) of the merged dictionary with the entry of the current dictionary. If the entry is found at Entry Found Query 632, the dictionary associates the meaning(s) with the entry at Associate Meaning Step 634. The new meaning(s) found in the merged dictionary is/are appended to the previously stored meaning(s) found within the current dictionary such that the dictionary will provide multiple meanings for the entry. The dictionary will add a new entry and meaning(s) associated with the entry at Add Entry and Meaning Step 636 if the new entry is not found at Entry Found Query 632. The Merge Dictionary Routine 616 will merge the entries and meanings of the merged dictionary into the current dictionary such that all the entries and associated meanings of the merged dictionary will be loaded into the current dictionary.

Figure 7:
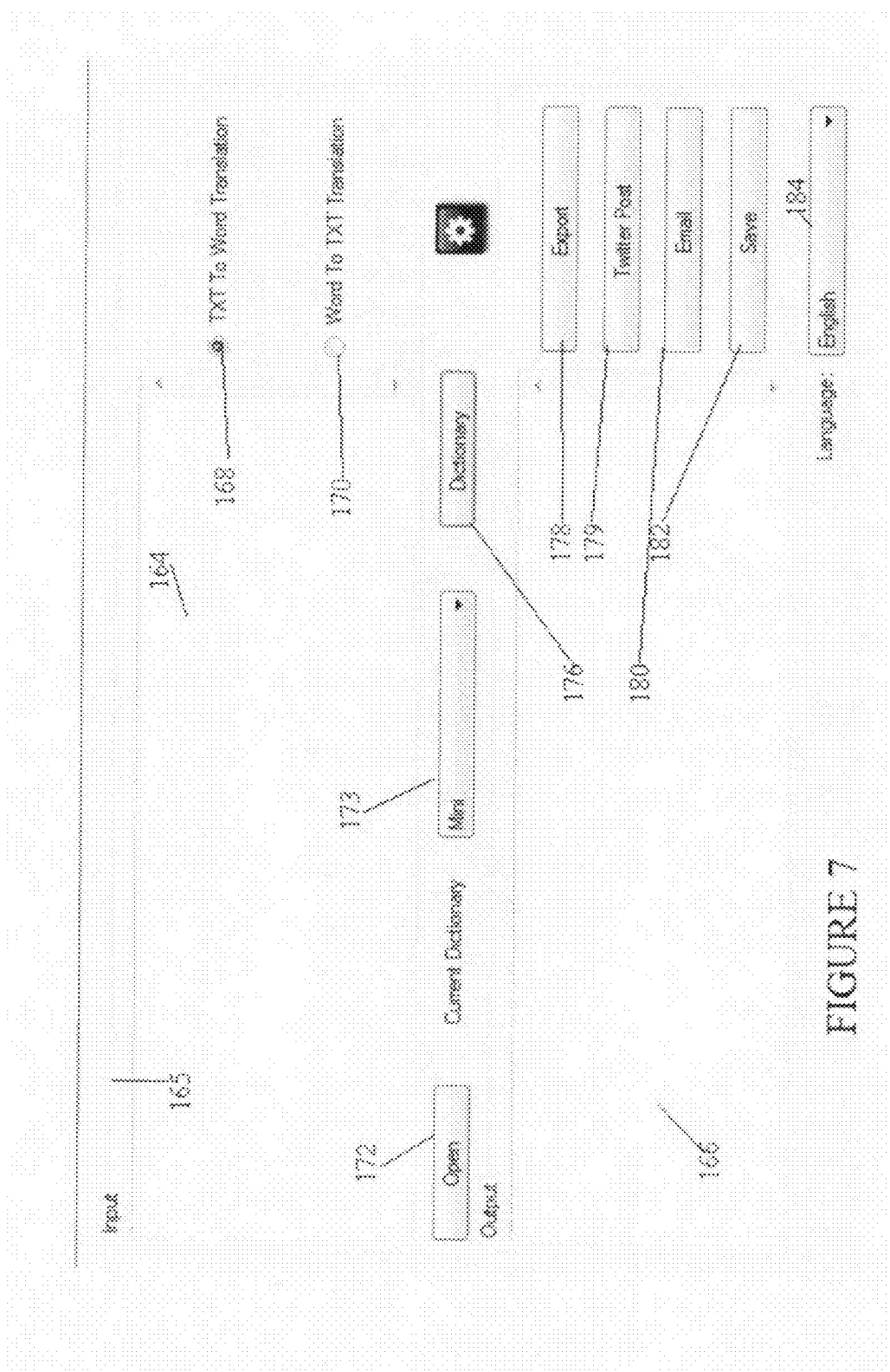
FIG. 7 is a view of one embodiment of the present invention.
Figure 7A:
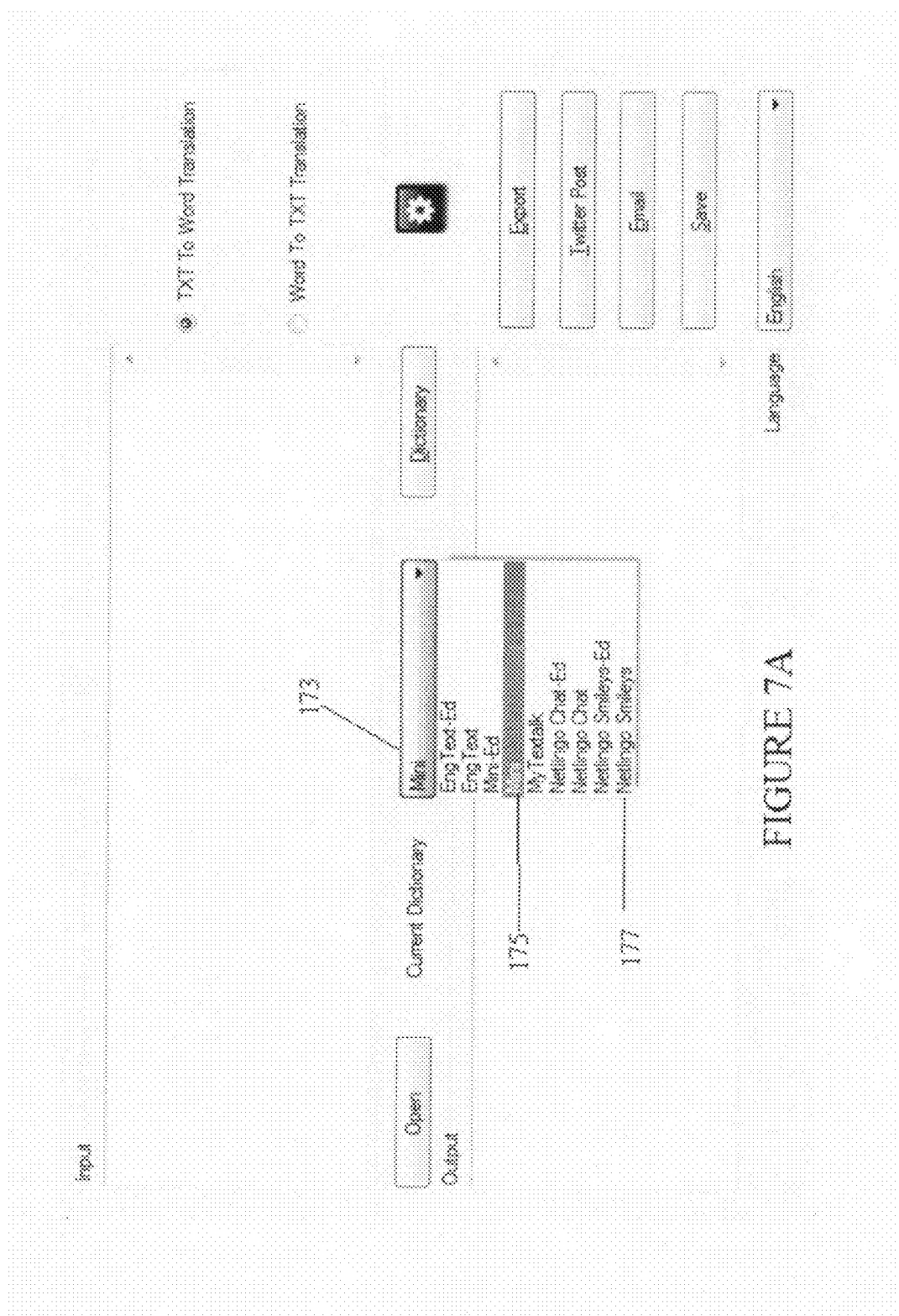
FIG. 7A is another view thereof.

FIG. 7 shows one embodiment of the translator 165. A user enters the entered text to be translated into input box 164. The translator translates the entered text and displays the translated text in output box 166. Input box 164 and output box 166 enables the user to view the text as entered and the translated text. The user enters text into input box 164. The translator does not alter the text found within input box 164. The entered text in input box 164 remains the same as entered. However, the user may edit the entered text found in input box 164. The translator translates the text found within input box 164 and enters the translated text into output box 166.

In the embodiment shown in FIG. 7, the user enters text into input box 164. The translator reads the text in input box 164 and compares the character strings in input box 164 to the current dictionary. The translator does not alter the text found in input box 164. The translator translates the text and displays the translated text in output box 166. Because the translator does not alter the text entered in input box 164, the user can review the text as entered and compare it to the translated text found in output box 166.

The embodiment shown in FIG. 7 translates text as the user enters the characters of the entered string. As the user enters text, the translator compares the characters of the entered text to the dictionary. The translator displays all of the possible matches of the entered text. The user may then select the appropriate match. If only one match is found, the translator selects the match. The translator then displays the selected match in the output box 166. If a match is not selected or the translator does not find a match, the translator displays the entered text in the output box 166.

The type of entered text for conversion depends on the user's selected translation. The user selects to translate from entry to meaning by selecting TXT to Word Translation selection 168. Likewise, the user selects to translate from meaning to entry by selecting Word to TXT Translation selection 170.

If the user selects TXT to Word Translation selection 168, the user inputs entered text using entries that the translator will translate to meanings found within the loaded dictionary. The translator will translate the entered text in input box 164 according to Entry to Meaning Routine 126. The translator displays the translated text in output box 166.

If the user selects Word to TXT translation 170, the user inputs entered text using meanings that the translator will translate to entries found within the loaded dictionary. The translator will translate the entered text in input box 164 according to Meaning to Entry Routine 128. The translator displays the translated text in output box 166.

Open selection 172 enables the user to select a file to be opened. A text editor opens the selected file for viewing, printing, and/or editing. The user may also perform other functions to the file that are allowed by a text editor.

To properly translate the text entered into input box 164, the user selects the dictionary to be referenced during the translation routine. The user selects the dictionary by selecting Dictionary Selection 176. After selecting Dictionary Selection 176, the present invention displays a dictionary selection screen shown in FIG. 11, described below. The user then selects the dictionary for translating the entered text.

After the entered text is translated, the user may output the translated text according to the user's selected output. The user may output the translated text to a text editor by selecting Export Selection 178. The user may also email the output text by selecting Email Selection 180. After selecting Email Selection 182, the translator opens an email program with the translated text in the body of the email. The user may then designate the recipients of the email and identify the subject of the email. The user may save the translated text found in output box to a file by selecting Export Selection 182. The translator creates a new text file storing the translated text.

The user may also select to export the translated text directly to a file. The user selects the location to save the file. The present invention also allows a user to copy the translated text to be inserted into an alternate program. In one embodiment, the translator enables a user to copy the translated text to a social network, such as Twitter, by selecting Twitter Post Selection 179. Likewise, the user could copy the translated text to Facebook, MySpace, an SMS text message, other messaging software, other social applications, or any other application that may use input text.

FIG. 7 shows an embodiment of the present invention that translates the entered text as the user enters the text. The translator automatically translates the entered text. The translator also displays the current dictionary at Loaded Dictionary Selection 173. Loaded Dictionary Selection 173 provides a drop down menu 177, shown in FIG. 7A, showing the dictionaries that the user may select. The user selects one of the dictionaries, the selected dictionary 175, for translating the text found in input box 164. After selecting the selected dictionary 175, the translator will replace the current dictionary with the selected dictionary 175 for translating. The Loaded Dictionary Selection will identify the selected dictionary 175 as the current dictionary.

Figure 8:
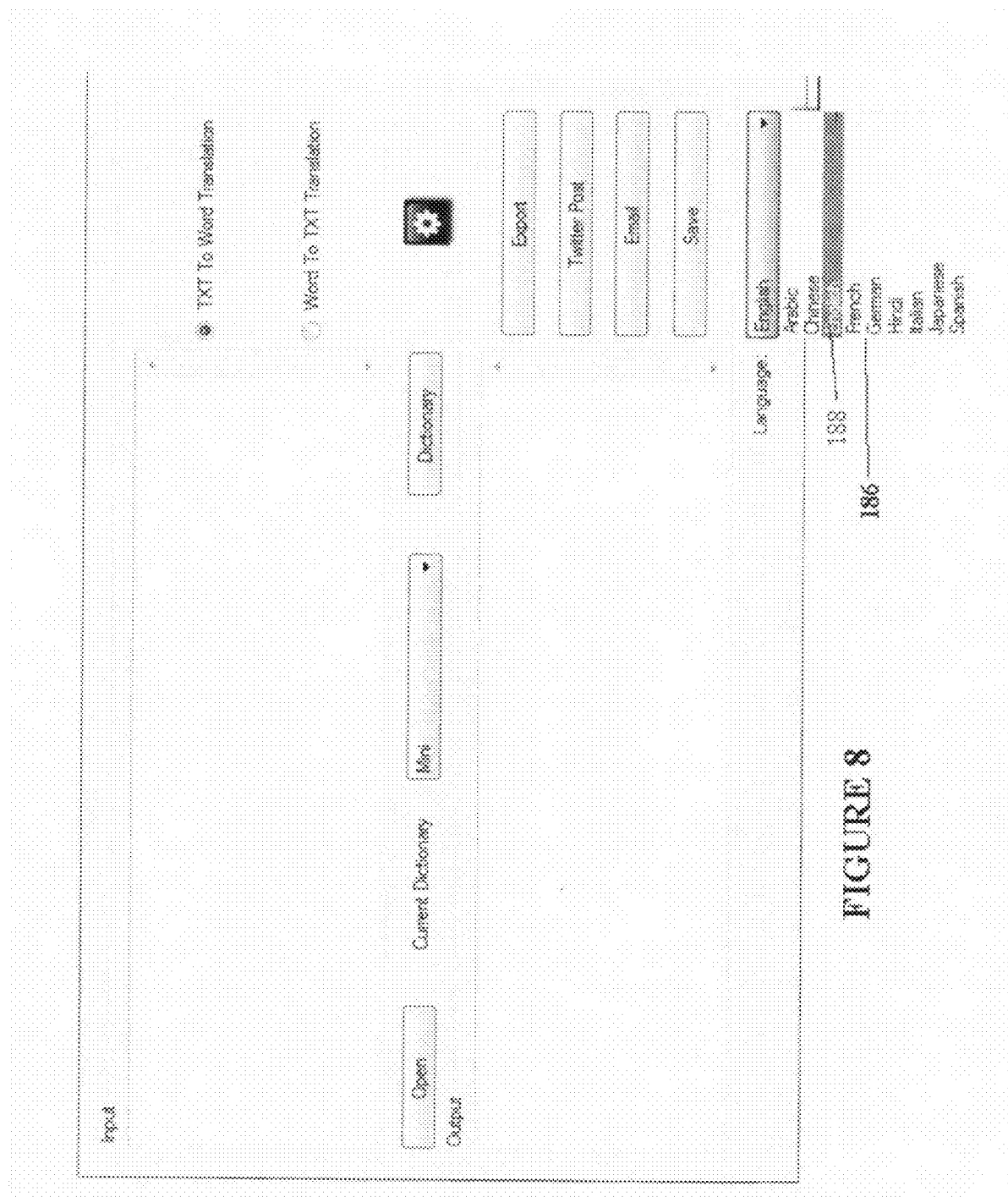
FIG. 8 is another view of one embodiment of the present invention.
Figure 9:
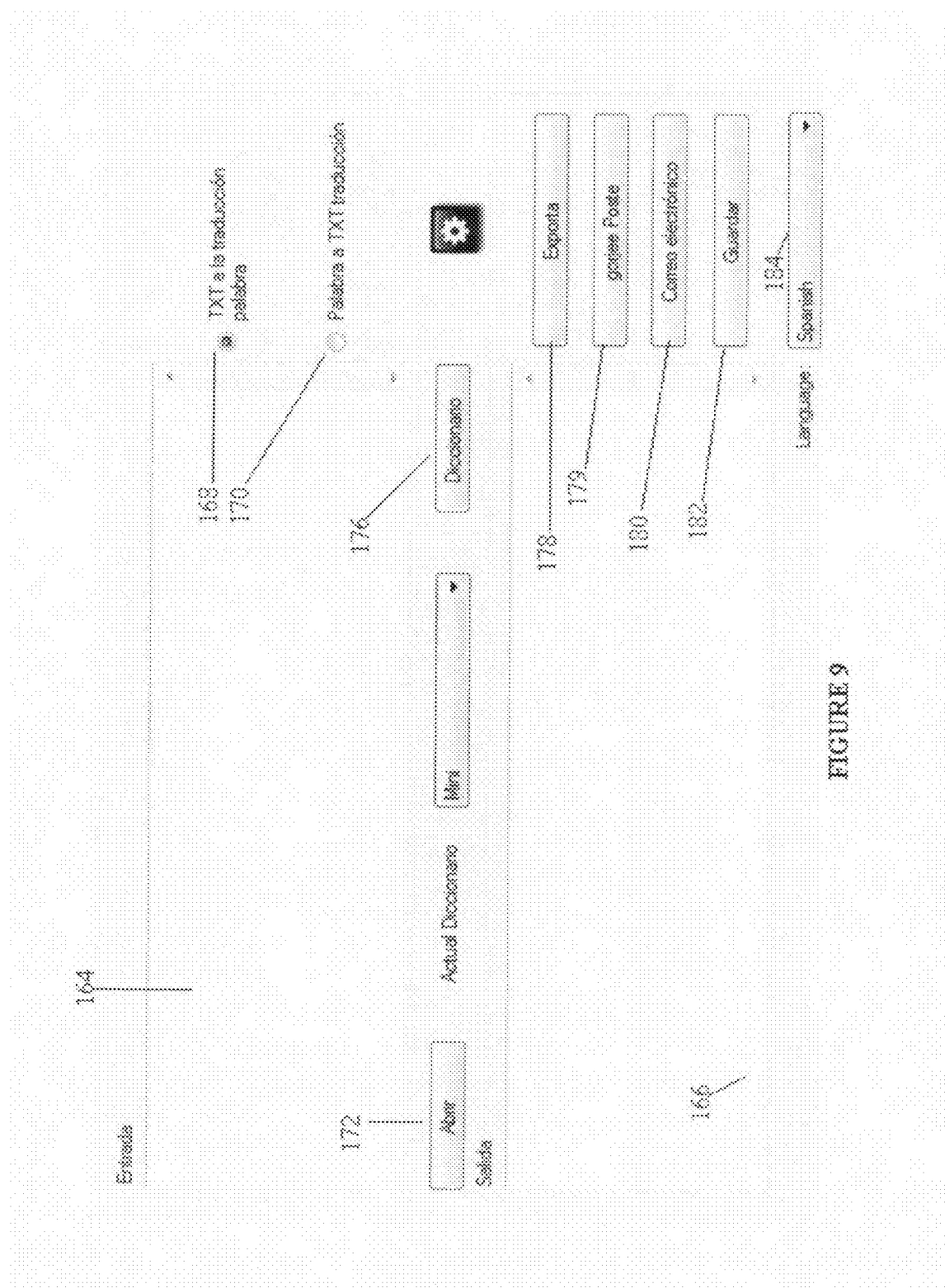
FIG. 9 is another view thereof.

The translator enables the user to select the language displayed on the selection buttons of the translator by selecting Language Selection 184. FIG. 8 shows the language options 186. The translator displays the selection buttons according to the selected language 188. FIG. 9 shows an embodiment in which Spanish is selected as the language selection 184.

Figure 10A:
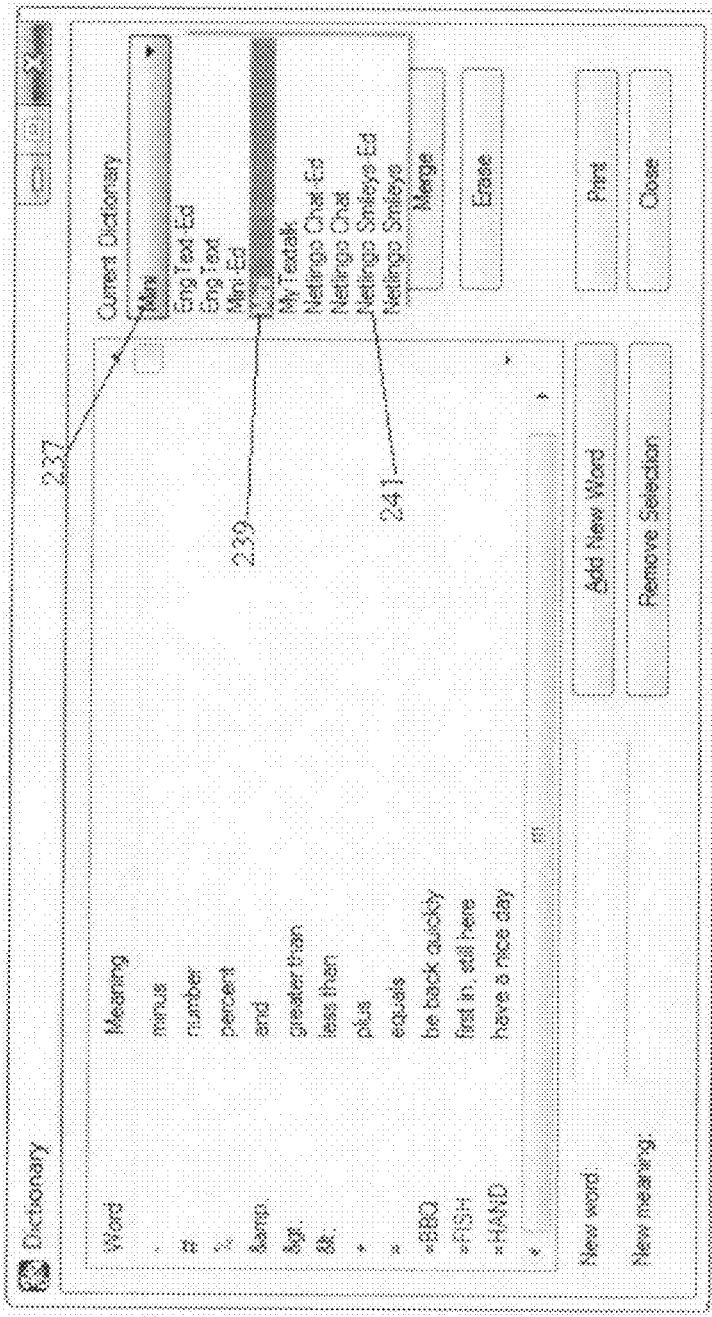
FIG. 10A is another view thereof.

FIG. 10 shows the current dictionary and edit dictionary routine as shown on a display, monitor, etc. The dictionary has entries 192 associated with meanings 196. The current dictionary shown in FIG. 10 associates dictionary entry 194, "#:-)" with the meaning 198, "messy hair." The Current Dictionary Selection 237 shows the current dictionary that the translator uses in translating the text entered in input box 164 for display in output box 166. The Current Dictionary Selection 237 displays a dictionary menu 241 of selectable dictionaries, as shown in FIG. 10A, that the user may use for the translation. The user may choose a selected dictionary 239. By selecting the selected dictionary 239 from the Current Dictionary Selection 237, the translator replaces the current dictionary with the selected dictionary 239. The translator will then use the selected dictionary 239 for translating the text entered in input box 164. The translator will also update the Current Dictionary Selection 237 to identify the selected dictionary 239. The user may also load a new dictionary by selecting Open Dictionary 238. The user may also save the current dictionary to a file by selecting Save Dictionary 240. The translator saves the current dictionary in storage as a new file to be used later. The user selects the location for saving the dictionary. The user may also merge other saved dictionaries with the current dictionary by selecting Merge selection 212. The user then selects the dictionary files to be merged with the current dictionary. The user may also erase the current dictionary by selecting erase selection 214. The translator will then load the default dictionary to be used for the translation.

The user may also add new entries, edit entries, and/or remove entries of the current dictionary. To add a new entry, the user enters a new entry into word input 234 and entering a new meaning into meaning input 236. The user then selects Add New Word selection 246.

The user may also remove an entry from the current dictionary. The user selects the entry and meaning to be removed. As shown in FIG. 10, the user has indicated selected entry 229 (("," -), "winking happy"). The user selects the selected entry 229 with the input device. After highlighting the selected entry 229, the user selects Remove Selection 246 to remove the selected entry from the current dictionary. The user may also print the current dictionary to show the entries 192 and meanings 196 associated with the current dictionary 190. The user can close the dictionary window by selecting close selection 218.

Figure 11:
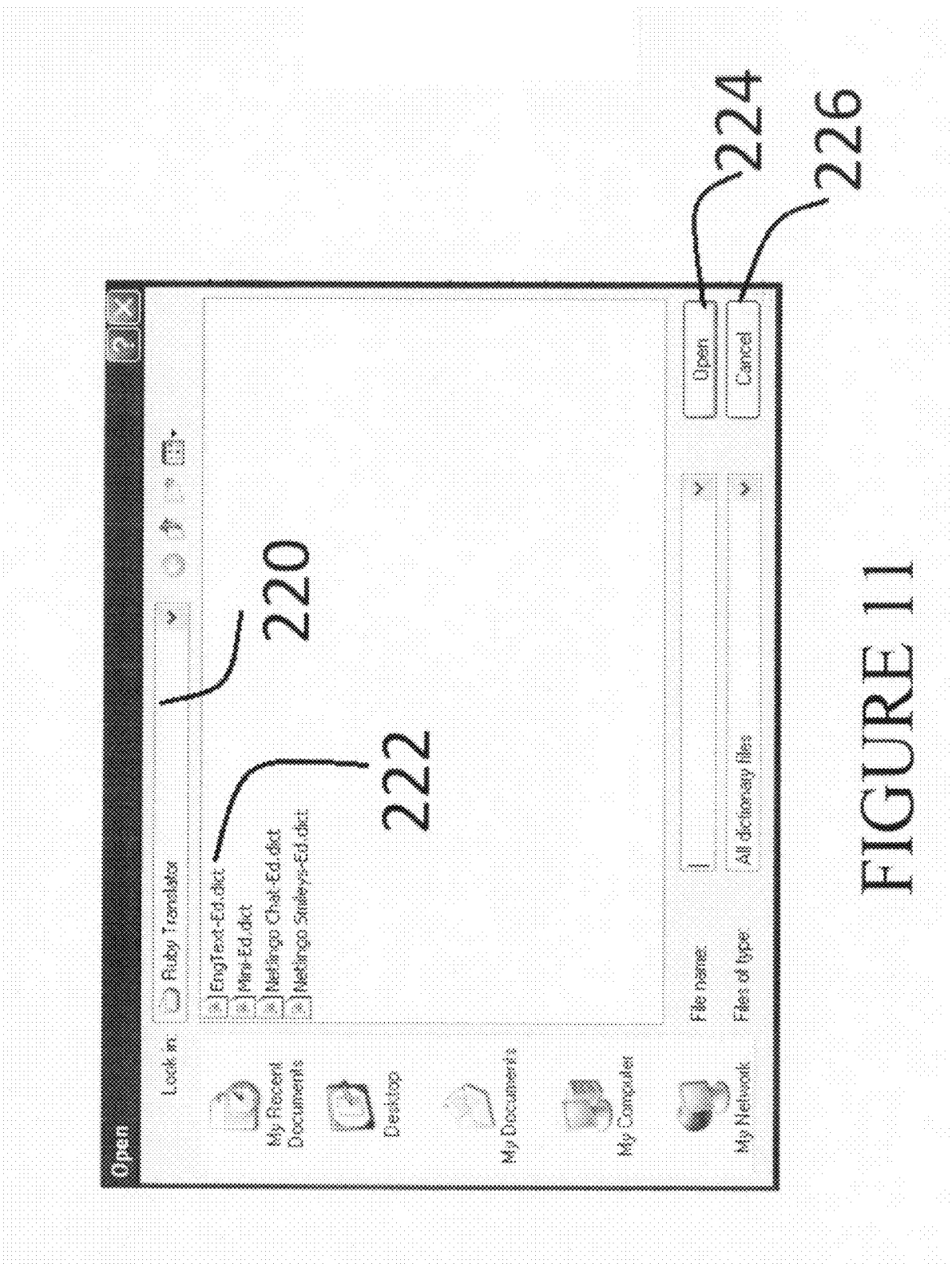
FIG. 11 is another view of one embodiment of the present invention.

FIG. 11 shows the dictionary files that the user may load. The user may select dictionary files 222 stored in dictionary folder 220 of the storage. The dictionary files may be stored in other locations of storage. The user opens the selecting dictionary files by selecting open selection 224. The user may cancel opening a dictionary by selecting cancel selection 226.

FIG. 12 shows a sample of one dictionary in a one column table. The entries are listed in the odd rows of the table and the meanings are listed in the even rows of the table. For example, entry 252 ("a-bomb") has the multiple meanings 254 ("marijuana cigarette with heroin") and ("marijuana cigarette with opium"). The user can select between the two different meanings. The multiple meanings are separated by a separator such as "-or-" in this embodiment. Other separators may be used to distinguish the multiple meanings.

Continuing to refer to FIG. 12, multiple entries may be assigned to one meaning. For example, entries 256 ("Acapulco red-or-afgani indica-or-aftican-or-aftican black-or-african bush . . . ") are associated with meaning 258 (marijuana from South West Mexico).

The dictionary shown in FIG. 12 assists police officers and other enforcement agents in crime prevention. Because enforcement agents may not know the most current slang language used, the translator assists the enforcement agent with translating the slang language. The dictionary provides additional information to enforcement agents to assist with carrying out their duties.

FIGS. 13A-13D show a sampling of entries 192 and the associated meanings 196 of a dictionary. Dictionary 230 associates symbols, such as entry 262 (=) with the meaning 264 (equals). The present invention is not limited in using symbols to represent words. Furthermore, the present invention may use other text representations as short hand for longer phrases. Dictionary 260 associates entry 270 ("AAMOI"), shown in FIG. 13B, with meaning 272 ("as a matter of interest") for translation. The dictionary shown in FIGS. 13A-13D is only a sampling of entries and meanings that can be stored in dictionary 260. Additional entries and meanings may be stored in dictionary 260.

Figure 14A:
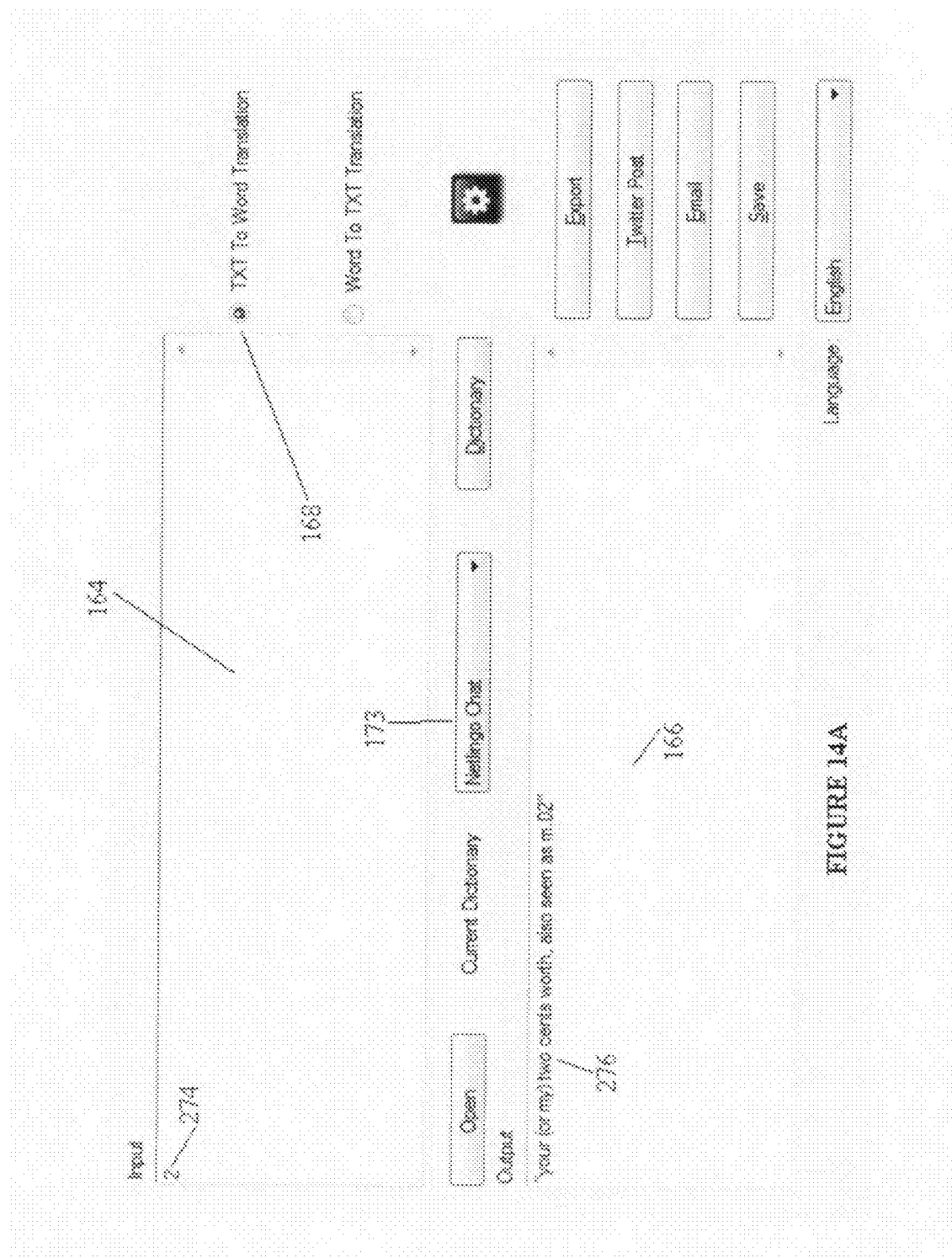
FIGS. 14A-14F are views of one embodiment of the present invention.
Figure 14B:
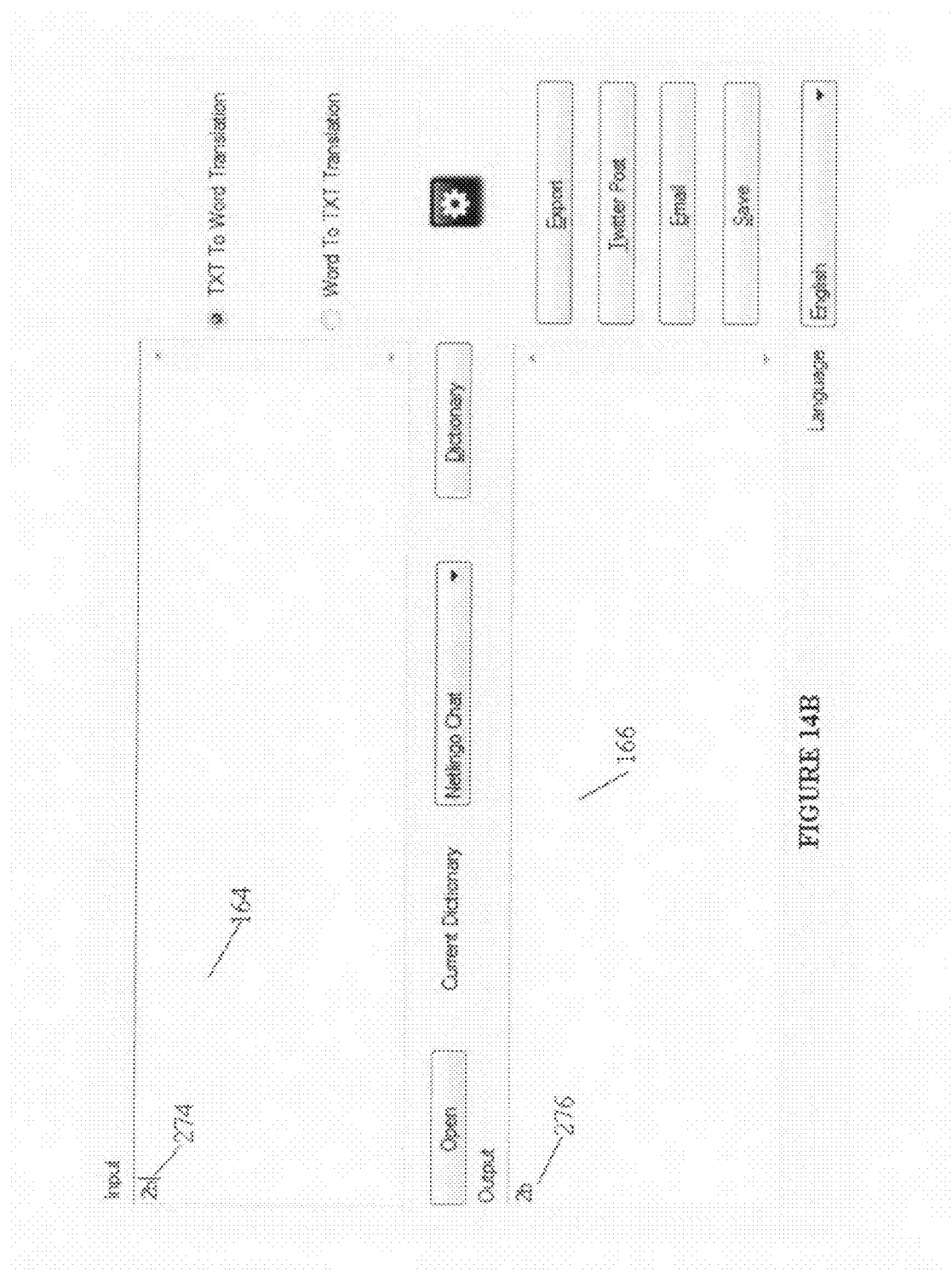

FIGS. 14A-14F show the process of entering text into input box 164 and the translator displaying the converted text in output box 166. The user inputs text entry 274 into input box 164. The translator compares the text entry 274, "2", to the entries found in the loaded dictionary 173 because the user has selected to perform a TXT to Word Translation 168. As shown in output box 166, the translator has found a match for text entry 274. The translator displays the converted text 276 ("your (or my) two cents worth, also seen as m.02") in output box 166. If the user intended to enter the converted text 276, the user could enter a space character, punctuation, or other delimiter. However, the user intended to enter more text. Therefore, the user continues entering text as shown in FIG. 14B. The user enters text entry 274 ("2b") into input box 164. No match is found. The translator displays text entry 274 into output box 166 as displayed text 276.

Figure 14C:
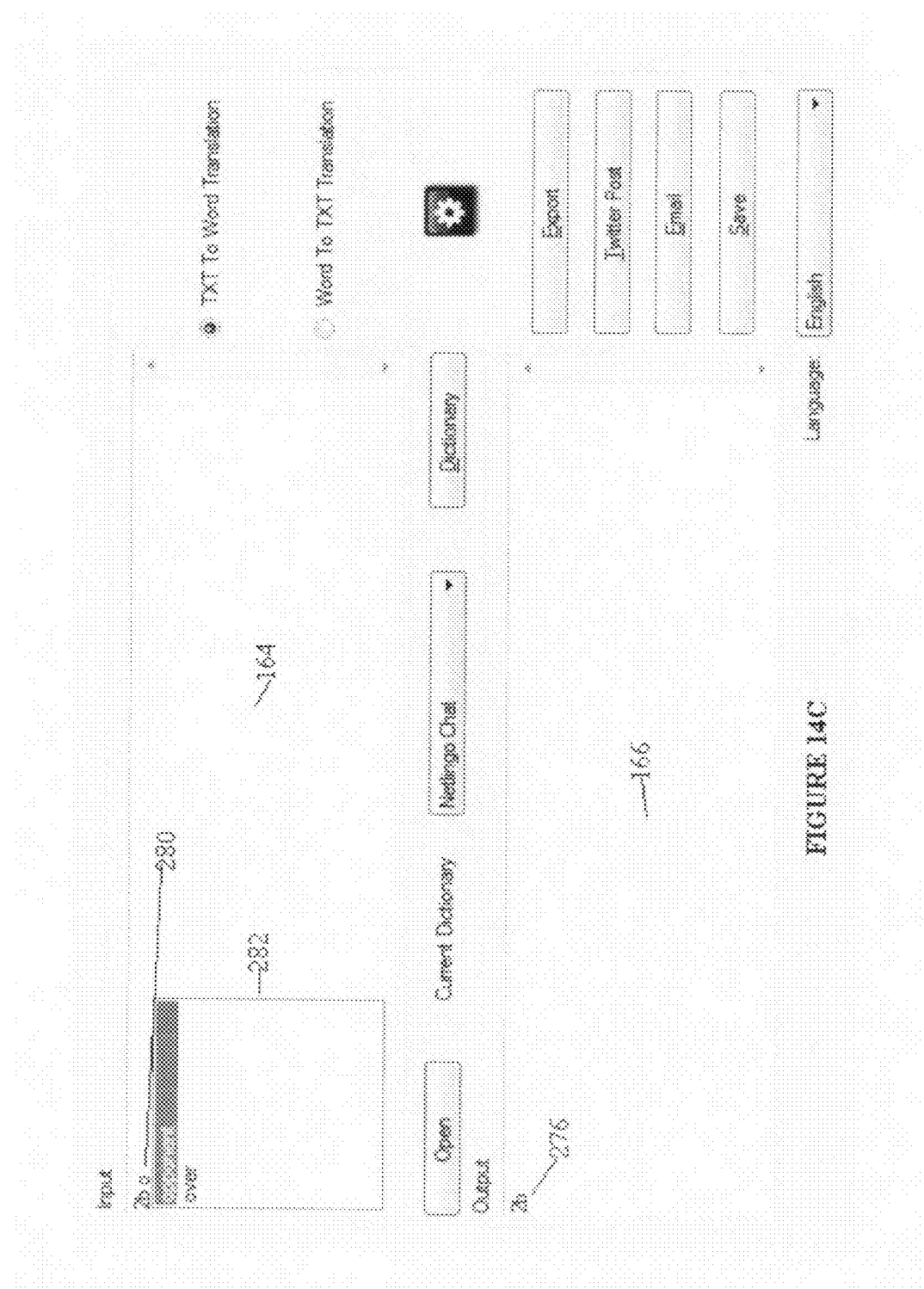

FIG. 14C shows an example in which the user has entered a text entry 280 that matches a dictionary entry 192 associated with multiple meanings 198. The selection menu 282 provides a listing of the different meanings associated with the matched entry. The user may select the appropriate meaning to be displayed in output box 166. Likewise, if the user was performing a Word to TXT translation, the selection menu 282 would show entries associated with a matched meaning. The user could then select the appropriate entry to be display in output box 166.

Figure 14D:
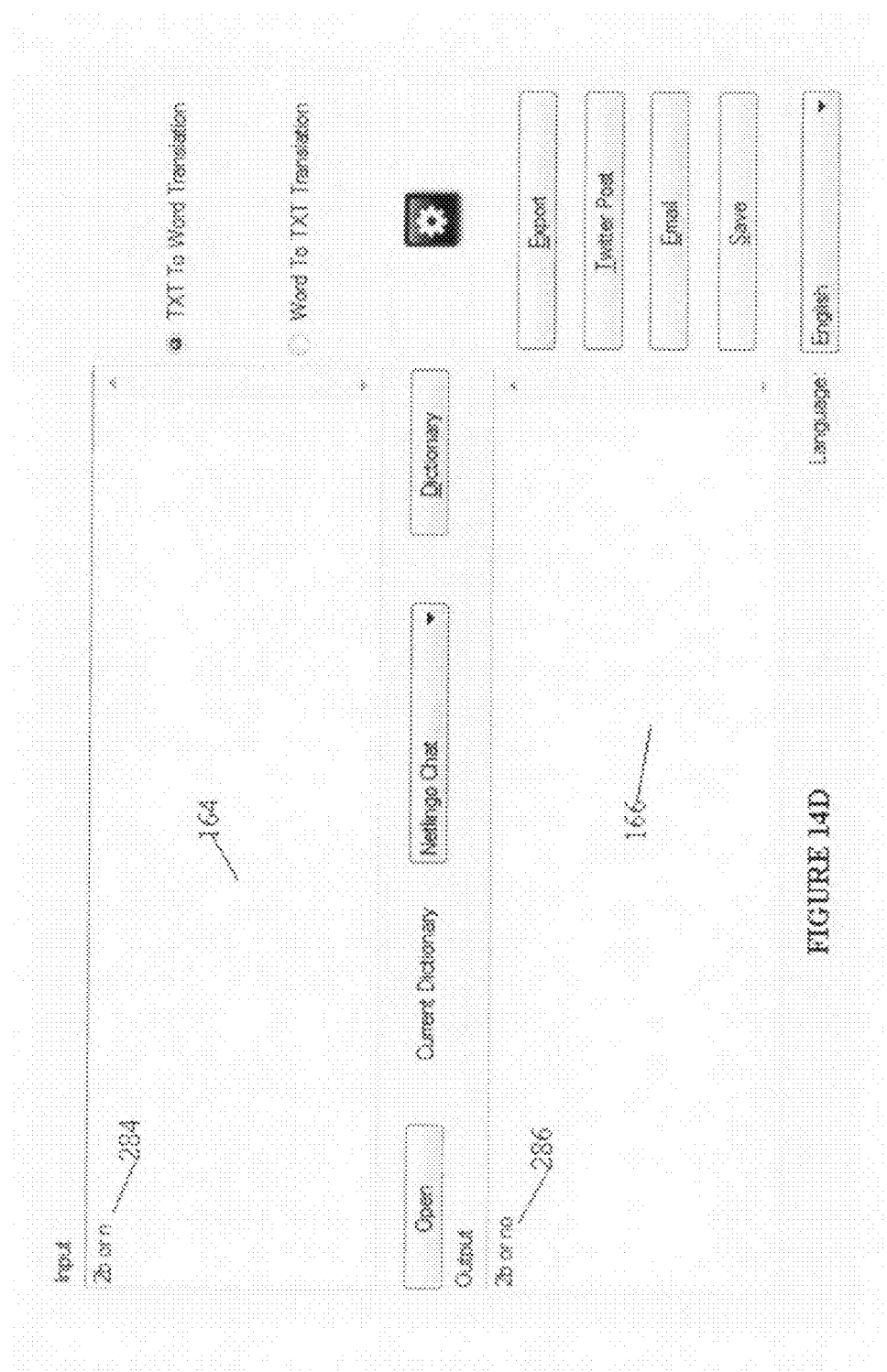
Figure 14E:
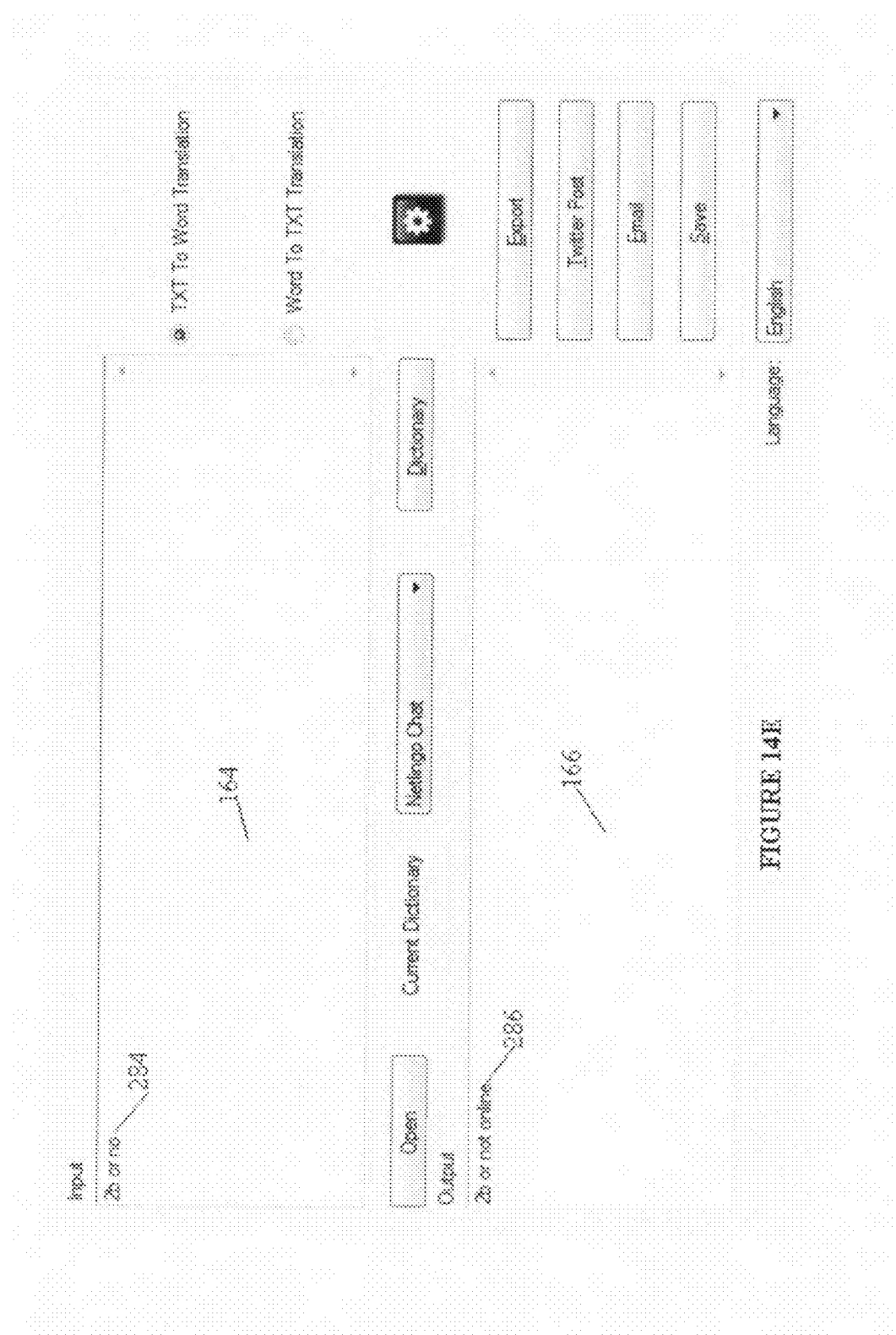
Figure 14F:
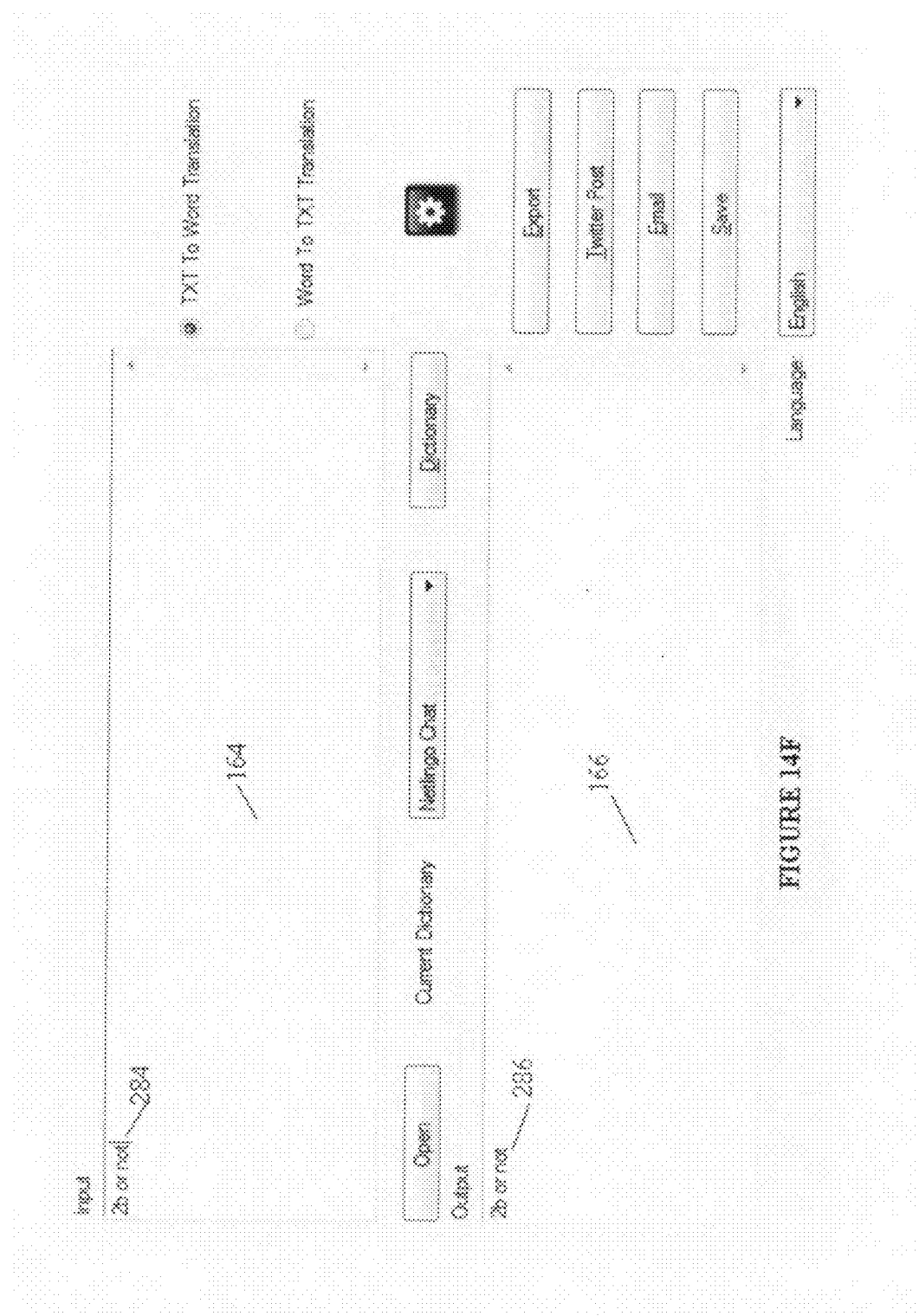

The user continues to enter text because the user did not wish for either of the meanings shown in selection menu 282. FIGS. 14D-14F show the user enter text and the matches found. After the user enters text entry 284, the translator displays converted text 286 to be displayed in output box 166 as shown in FIG. 14D. The user enters the character "o" for text entry 284. Again, the translator finds a matched entry and displays converted text 286 in output box 166 as shown in FIG. 14E. The user continues to enter the character "t" for text entry 284. The translator does not find a match in the current dictionary. The translator displays the displayed text 286 in output box 166. In one embodiment of the present invention, the user may edit the text displayed in output box 166.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method implementing a translator on a computing device for accepting a translation entry comprising characters from a user wherein the translator translates the translation entry to translated output for the user, the method comprising:

the computing device displaying an input box and an output box on a display wherein the input box is separate from the output box, the input box and the output box both accepting entry of at least one character from the user;

the input box configured to accept the translation entry of at least one character from an input device;

storing a first dictionary within a database;

the first dictionary comprising at least one dictionary entry comprising characters and at least one meaning, the dictionary defining a relationship associating the dictionary entry with the meaning, the database defining the relationship between the dictionary entry and the meaning;

accepting a translation entry from the user in the input box;

accepting a selected translation identifier from a user, the selected translation identifier designating at least one of entry translation and meaning translation wherein the selected translation identifier distinguishes between the translator performing a meaning translation and an entry translation of the translation entry in the input box;

the translator performing an entry translation of the translation entry in the input box if the selected translation identifier indicates entry translation;

the entry translation comprising:

the translator comparing the characters of the translation entry entered into the input box to the characters of at least one dictionary entry of the first dictionary to find a matching dictionary entry;

the translator identifying a matching dictionary entry of the first dictionary for which the characters of the translation entry match the characters of the matching dictionary entry;

the dictionary associating the matching dictionary entry with a first meaning comprising characters and a second meaning comprising characters;

the translator identifying the first meaning and the second meaning associated with the matching dictionary entry wherein the characters of the first meaning and the second meaning may not match the characters of the translation entry and the matching dictionary entry;

the computing device generating a selection list comprising the first meaning and the second meaning associated with the matching dictionary entry;

the computing device displaying the selection list;

the computing device receiving a selection input identifying a selected meaning from one of the first meaning and the second meaning in the selection list;

the computing device displaying the selected meaning in the output box;

the computing device discontinuing the display of the meaning that was not selected with the selection input wherein the selection input causes the unselected meaning to no longer be displayed;

the translator performing a meaning translation of the translation entry in the input box if the selected translation identifier indicates meaning translation;

the meaning translation comprising: the translator comparing the translation entry entered into the input box to at least one meaning of the first dictionary to find a matching meaning, the translator identifying at least one dictionary entry associated with the matching meaning, displaying the dictionary entry associated with the matching meaning in the output box if a matching meaning is identified.

2. The method of claim 1 wherein the input box is distinct from the output box, the computing device allowing editing of text within the output box;

and the computing device displaying the translation entry in the input box.

3. The method of claim 1 wherein the user selects a merging dictionary to be merged with the first dictionary, the computing device creating a current dictionary wherein the current dictionary stores all of the dictionary entries of the first dictionary and the merging dictionary, the current dictionary storing all of the meanings of the first dictionary and the merging dictionary, the current dictionary forming the associations between the dictionary entries and the meanings found within the first dictionary and the merging dictionary.

4. The method of claim 1 wherein the computing device performs the translation during entry of the text entry.

5. A method implementing a translator on a computing device for accepting a text entry comprising characters from a user wherein the translator translates the text entry to translated output for the user, the method comprising:

the computing device accepting the text entry in an input box;

the translator accessing a first dictionary;

the first dictionary comprising at least one dictionary entry comprising characters and a first meaning and a second meaning associated with the dictionary entry wherein the meanings comprise characters, the first dictionary defining a relationship associating the dictionary entry with both the first meaning and the second meaning;

the translator comparing the characters of the text entry to the characters of at least one dictionary entry of the first dictionary to identify a matching dictionary entry in which the characters of the text entry match the characters of the matching dictionary entry;

the translator identifying the first meaning and the second meaning associated with the matching dictionary entry;

the computing device generating a selection list comprising the first meaning and the second meaning associated with the matching dictionary entry wherein the selection list is separate from the input box and an output box;

the computing device displaying the selection list;

the computing device receiving a selection input identifying a selected meaning from one of the first meaning and the second meaning in the selection list;

the output box separate from the input box, the output box accepting entry of at least one character from the user for editing of text in the output box;

the computing device displaying the selected meaning in the output box; and the computing device discontinuing the display of the meaning that was not selected with the selection input.

6. The method of claim 5 wherein the selection input causes the unselected meaning to no longer be displayed;

the computing device displaying the selected meaning in the output box and displaying the text entry in the input box after receiving the selection input.

7. The method of claim 5 further comprising:
the computing device accepting a selected translation identifier that designates whether the translator perform entry translation or meaning translation;
the translator performing an entry translation of the text entry if the selected translation identifier indicates entry translation;
the entry translation comprising:
the translator comparing the text entry entered to at least one dictionary entry of the first dictionary to find a matching dictionary entry;
the translator identifying a first meaning and a second meaning associated with the matching dictionary entry;
the computing device displaying the first meaning and the second meaning associated with the matching dictionary entry;
the computing device receiving a selection input identifying a selected meaning from one of the first meaning and the second meaning wherein the selection input causes
the unselected meaning to no longer be displayed;
the computing device displaying the selected meaning in the output box and displaying the text entry in the input box after receiving the selection input;
the computing device discontinuing the display of the meaning that was not selected with the selection input;
the translator performing a meaning translation of the text entry if the selected translation identifier indicates meaning translation;
the meaning translation comprising: the translator comparing the text entry to at least one meaning of the first dictionary to find a matching meaning, the translator identifying at least one dictionary entry associated with the matching meaning, displaying the dictionary entry associated with the matching meaning in the output box if a matching meaning is identified.

8. The method of claim 7, the meaning translation further comprising:
the computing device displaying the text entry in the output box if no matching meaning is found when comparing the text entry to the at least one meaning of the first dictionary.

9. The method of claim 5 further comprising:
the translator comparing the text entry to at least one meaning of the first dictionary to find a matching meaning;
the translator identifying a first dictionary entry and a second dictionary entry associated with the matching meaning;
the computing device displaying the first dictionary entry and the second dictionary entry associated with the matching meaning;
the computing device receiving a selection input identifying a selected dictionary entry from one of the first dictionary entry and the second dictionary entry;
the computing device displaying the selected dictionary entry in the output box;
the computing device discontinuing the display of the dictionary entry that was not selected with the selection input.

10. The method of claim 9 wherein the selection input causes the unselected dictionary entry to no longer be displayed;
the computing device displaying the text entry in the input box and the selected meaning in the output box after receiving the selection input.

11. The method of claim 5 further comprising:
the computing device displaying an input box and an output box on a display;
the input box configured to accept the text entry of at least one character from an input device;
the computing device displaying the text entry in the input box;
wherein the input box is distinct from the output box, the input box accepting the text entry and the output box displaying the translated output.

12. The method of claim 5 wherein the dictionary is stored in a database.

13. The method of claim 5, the entry translation further comprising:
the computing device displaying the text entry in the output box if no matching dictionary entry is found when comparing the text entry to the at least one dictionary entry of the first dictionary.

14. The method of claim 5 wherein the text entry is entered by the user.

15. The method of claim 14 wherein the text entry is entered into an input box wherein the input box is distinct from the output box, the input box accepting the text entry and the output box displaying the translated output.

16. The method of claim 5 wherein the computing device performs the translation during entry of the text entry.

17. A method implementing a translator on a computing device for accepting a text entry comprising characters from a user wherein the translator translates the text entry to translated output for the user, the method comprising:
an input box configured to accept the text entry;
an output box configured to display the translated output, the output box separate from the input box;
the computing device accepting the text entry;
the translator accessing a first dictionary;
the first dictionary comprising at least one dictionary entry comprising characters and at least one meaning comprising characters, the first dictionary defining a relationship associating the dictionary entry with the meaning;
the translator comparing the characters of the text entry to the characters of at least one dictionary entry of the first dictionary to find a matching dictionary entry in which the characters of the text entry match the characters of the dictionary entry;
the dictionary associating the matching dictionary entry with a first meaning and a second meaning;
the translator identifying the first meaning and the second meaning associated with the matching dictionary entry;
the computing device generating a selection list comprising the first meaning and the second meaning associated with the matching dictionary entry;
the computing device displaying the selection list;
the computing device receiving a selection input identifying a selected meaning from one of the first meaning and the second meaning in the selection list;
the computing device displaying the text entry in the input box and the selected meaning in the output box after receiving the selection input wherein the selection input does not modify the text entry in the input box; and
the computing device discontinuing the display of the meaning that was not selected with the selection input.

18. The method of claim 17 wherein the output box accepts entry of at least one character from the user.

19. The method of claim 18 wherein the computing device accepts input from the user allowing the user to edit text within the output box.

20. The method of claim 17 wherein the computing device performs the translation during entry of the text entry; and
 the computing device displaying the first meaning and the second meaning in a selection list separate from the input box and the output box;
 the computing device displaying the text entry in the input box.

\* \* \* \* \*